(12) United States Patent
Ren et al.

(10) Patent No.: US 11,363,473 B2
(45) Date of Patent: Jun. 14, 2022

(54) SYSTEMS AND METHODS FOR ADAPTIVE SRS TRANSMIT ANTENNA SELECTION

(71) Applicant: Telefonaktiebolaget LM Ericsson (publ), Stockholm (SE)

(72) Inventors: Hong Ren, Kanata (SE); Jianguo Long, Kanata (CA); Yongquan Qiang, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 152 days.

(21) Appl. No.: 16/636,388

(22) PCT Filed: Aug. 31, 2017

(86) PCT No.: PCT/IB2017/055254
§ 371 (c)(1),
(2) Date: Feb. 4, 2020

(87) PCT Pub. No.: WO2019/043436
PCT Pub. Date: Mar. 7, 2019

(65) Prior Publication Data
US 2020/0178092 A1    Jun. 4, 2020

(51) Int. Cl.
*H04B 7/08* (2006.01)
*H04B 7/06* (2006.01)
(Continued)

(52) U.S. Cl.
CPC .......... *H04W 24/02* (2013.01); *H04B 7/0608* (2013.01); *H04B 7/0834* (2013.01);
(Continued)

(58) Field of Classification Search
CPC ... H04W 24/02; H04B 7/0608; H04B 7/0834; H04B 7/0404; H04B 1/713;
(Continued)

(56) References Cited

U.S. PATENT DOCUMENTS 8,046,029 B2 * 10/2011 Teo ...................... H04B 7/0691
455/562.1
2014/0233665 A1 * 8/2014 Clevorn ................ H04B 7/061
375/267
(Continued)

OTHER PUBLICATIONS

Author Unknown, "Third Generation Partnership Project; Technical Specification Group Radio Access Network; Evolved Universal Terrestrial Radio Access (E-UTRA); Physical channels and modulation (Release 14)," 3GPP TS 36.211 V14.1.0, Dec. 2016, 3GPP Organizational Partners, 175 pages.
(Continued)

*Primary Examiner* — Faruk Hamza
*Assistant Examiner* — Aixa A Guadalupe Cruz
(74) *Attorney, Agent, or Firm* — Withrow & Terranova, PLLC

(57) ABSTRACT

Systems and methods for selectively enabling antenna selection at a wireless device for uplink sounding reference signal transmission in a Time Division Duplexing (TDD) wireless communication system are disclosed. In some embodiments, a method of operation of a network node comprises making a determination as to whether to enable or disable antenna selection at a wireless device for transmission of uplink sounding reference signals based on: an estimated speed of movement of the wireless device; both the estimated speed and a Signal to Interference plus Noise Ratio (SINR) for one or more downlink channels to the wireless device; or the estimated speed, the SINR for the one or more downlink channels, and a rank used for downlink transmission to the wireless device. The method further comprises sending, to the wireless device, an indication that indicates whether the wireless device is to enable or disable antenna selection.

17 Claims, 17 Drawing Sheets

(51) Int. Cl.
  H04W 24/02    (2009.01)
  H04L 5/00     (2006.01)
  H04L 5/14     (2006.01)
(52) U.S. Cl.
  CPC .......... H04L 5/0007 (2013.01); H04L 5/0048 (2013.01); H04L 5/14 (2013.01)
(58) Field of Classification Search
  CPC ....... H04L 5/0007; H04L 5/0048; H04L 5/14; H04L 5/0023; H04L 27/2611; H04L 5/143; H04J 11/0026
  See application file for complete search history.

(56) References Cited

U.S. PATENT DOCUMENTS

| | | | |
|---|---|---|---|
| 2015/0010099 A1* | 1/2015 | Lin | H04B 7/0608 375/267 |
| 2015/0016489 A1 | 1/2015 | Mehta et al. | |
| 2015/0333810 A1 | 11/2015 | Autti et al. | |

OTHER PUBLICATIONS

Author Unknown, "Third Generation Partnership Project; Technical Specification Group Radio Access Network; Evolved Universal Terrestrial Radio Access (E-UTRA); Physical layer procedures (Release 14)," 3GPP TS 36.213 V14.1.0, Dec. 2016, 3GPP Organizational Partners, 414 pages.
Author Unknown, "Third Generation Partnership Project; Technical Specification Group Radio Access Network; Evolved Universal Terrestrial Radio Access (E-UTRA); Radio Resource Control (RRC) Protocol specification (Release 14)," 3GPP TS 36.331 V14.1.0, Dec. 2016, 3GPP Organizational Partners, 654 pages.
Author Unknown, "Third Generation Partnership Project; Technical Specification Group Radio Access Network; Study on New Radio (NR) Access Technology; Physical Layer Aspects (Release 14)," 3GPP TR 38.802 V1.2.0, Feb. 2017, 3GPP Organizational Partners, 83 pages.
International Search Report and Written Opinion for International Patent Application No. PCT/IB2017/055254, dated May 17, 2018, 15 pages.
Examination Report for European Patent Application No. 17772480. 4, dated Sep. 27, 2021, 7 pages.

* cited by examiner

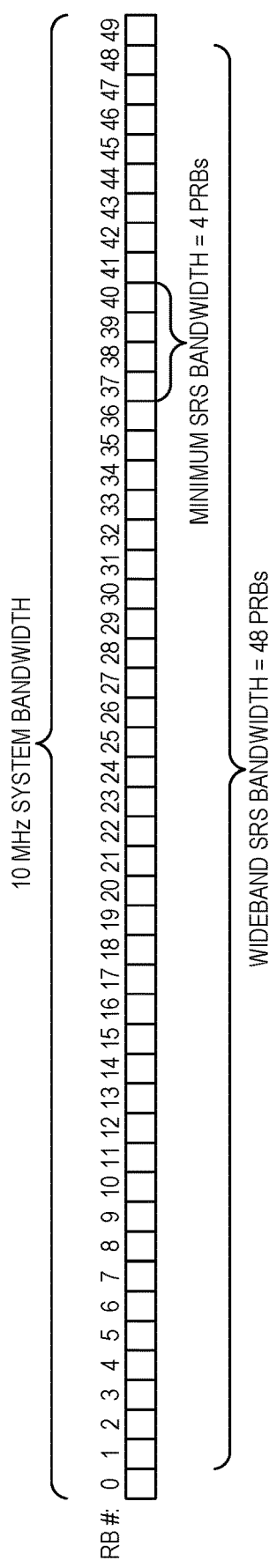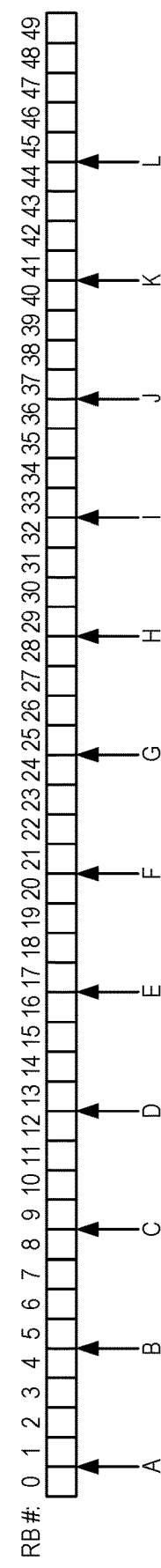
FIG. 6
FIG. 7

SYSTEMS AND METHODS FOR ADAPTIVE SRS TRANSMIT ANTENNA SELECTION

This application is a 35 U.S.C. § 371 national phase filing of International Application No. PCT/IB2017/055254, filed Aug. 31, 2017, the disclosure of which is incorporated herein by reference in its entirety.

TECHNICAL FIELD

The present disclosure relates to transmit antenna selection for uplink Sounding Reference Signal (SRS) transmission.

BACKGROUND

The next generation mobile wireless communication system (Fifth Generation (5G)), or New Radio (NR), will support a diverse set of use cases and a diverse set of deployment scenarios. The later includes deployment at both low frequencies (100s of Megahertz (MHz)), similar to Long Term Evolution (LTE) today, and very high frequencies (mm waves in the tens of GHz).

Similar to LTE, NR will use Orthogonal Frequency Division Multiplexing (OFDM) in the downlink (i.e. from a network node, or NR Base Station (gNB), to a User Equipment device (UE)). It is also referred to as Cyclic Prefix OFDM (CP-OFDM). In the uplink (i.e. from UE to gNB), both CP-OFDM and Discrete Fourier Transform (DFT) Spread OFDM (DFT-S-OFDM) will be supported. DFT-S-OFDM is also referred to as Single Carrier Frequency Division Multiple Access (SC-FDMA) in LTE.

The basic NR physical resource can thus be seen as a time-frequency grid similar to the one in LTE as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values (also referred to as different numerologies) in NR are given by $\Delta f=(15 \times 2^\alpha)$ kHz where a is a non-negative integer.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency, but for further study in time domain.

In the time domain, downlink and uplink transmissions in NR will be organized into equally-sized subframes similar to LTE as shown in FIG. 2, which illustrates the LTE time-domain structure with 15 Kilohertz (kHz) subcarrier spacing. In NR, the subframe length is 1 ms for all supported numerologies. A subframe is further divided into a number of slots of equal duration. There are two slots per subframe for 15 kHz subcarrier spacing as in LTE. For subcarrier spacing greater than 15 kHz, there are more than 2 slots per subframe. For convenience, subframe is used throughout the following description. However, it is understood that a subframe may be further divided into a number of slots and the discussions based on subframes are equally applicable to slots.

Downlink transmissions are dynamically scheduled, i.e., in each subframe the gNB transmits Downlink Control Information (DCI) about which UE data is to be transmitted to and which resource blocks in the current downlink subframe the data is transmitted on. This control signaling is typically transmitted in the first one or two OFDM symbols in each subframe in NR. The control information is carried on Physical Downlink Control Channel (PDCCH) and data is carried on Physical Downlink Shared Channel (PDSCH). A UE first detects and decodes PDCCH and if a PDCCH is decoded successfully, it then decodes the corresponding PDSCH based on the decoded control information in the PDCCH.

Uplink data transmissions are also dynamically scheduled using PDCCH. Similar to downlink, a UE first decodes uplink grants in PDCCH and then transmits data over the Physical Uplink Shared Channel (PUSCH) based on the decoded control information in the uplink grant such as modulation order, coding rate, uplink resource allocation, etc.

In addition to PUSCH, Physical Uplink Control Channel (PUCCH) is also supported in NR to carry Uplink Control Information (UCI) such as Hybrid Automatic Repeat Request (HARQ) related Acknowledgement (ACK), Negative Acknowledgement (NACK), or Channel State Information (CSI) feedback.

Although many details of NR PUCCH are still to be determined, it is envisioned that, similar to LTE, PUCCH resources will be pre-allocated in a cell and shared by all UEs.

In LTE, a number of Reference Signals (RS) are defined for downlink channel estimation. By measuring on a RS, a UE can estimate the effective channel the RS is traversing including the downlink radio propagation channel and both transmit and receive antenna gains. In more mathematical rigor, this implies that if a known RS signal $x_j$ ($j=1,2,\ldots,N_{tx}$) is transmitted on the jth transmit antenna port of a base station at a time-frequency resource element, the received signal $y_i$ ($i=1,2,\ldots,N_{rx}$) on the ith receive antenna port of a UE at the same time-frequency resource element can be expressed as $$y_i = h_{i,j} x_j + n_i$$

where $h_{i,j}$ is the effective channel between the jth transmit antenna port and the ith receive antenna port at the time-frequency resource element, $n_i$ is the receiver noise associated with the ith receive antenna port, $N_{tx}$ is the number of transmit antenna ports at the base station, and $N_{rx}$ is the number of receive antenna ports at the UE.

A UE can estimate the $N_{rx} \times N_{tx}$ effective channel matrix H ($H(i,j)=h_{i,j}$) for each time-frequency element over which RS is transmitted. The effective channel can thus be estimated over a Physical Resource Block (PRB), a subband (e.g. a few PRBs), or the whole system bandwidth (i.e. wideband).

For CSI feedback purpose, the channel rank, precoding matrix, and channel quality can be estimated based on the estimated channel. This is typically achieved by using a predesigned codebook for each rank, with each codeword in the codebook being a precoding matrix candidate. A UE searches through the codebook to find a rank, a codeword associated with the rank, and channel quality associated with the rank and precoding matrix to best match the effective channel. The rank, the precoding matrix and the channel quality estimation can be done per subband and/or wideband and reported in the form of a Rank Indicator (RI), a Precoding Matrix Indicator (PMI), and a Channel Quality Indicator (CQI).

The RSs for downlink channel estimation purpose includes:

Cell Specific Reference Signal (CRS): CRSs are transmitted in every subframe and over the entire frequency band. Up to four CRS ports are supported in LTE, each associated with one antenna port. CRSs are transmitted on a grid of Resource Elements (REs) in each PRB. An example of the CRS RE locations in a PRB is shown in FIG. 3. The frequency locations of the CRS REs are cell dependent and may be shifted for cells with different physical cell Identifiers (IDs).

Channel State Information Reference signal (CSI-RS): In LTE Release-10, a new reference signal was introduced for CSI estimation. The CSI-RS provides several advantages over CRS. Firstly, the CSI-RS is not used for demodulation of the data signal, and thus does not require the same density per PRB as CRS. Therefore, the overhead of the CSI-RS is substantially less. Secondly, CSI-RS provides a much more flexible means to configure CSI feedback measurements, i.e. which CSI-RS resource to measure on can be configured in a UE specific manner. In addition, up to 32 antenna ports can be supported by CSI-RS. CSI-RS is transmitted over the whole system bandwidth. In the time domain, CSI-RS can be transmitted periodically with preconfigured periodicity and subframe offset. CSI-RS can also be transmitted aperiodically, in which CSI-RS transmission is triggered dynamically by a DCI.

Demodulation Reference Signal (DMRS): DMRS is also used for downlink channel estimation but mainly for data demodulations. Unlike CRS, DMRS transmission is UE specific, i.e. it is only transmitted when there is DL data transmission to a UE. There are eight DMRS ports (ports 7 to 15) defined in LTE and up to eight layers (rank=8) of data can be supported. The DMRS port used is dynamically indicated in the associated PDCCH. The DMRS are transmitted on certain fixed REs in a PRB. The RE pattern for port 7 and port 8 are shown in FIG. 3. Ports 7 and 8 occupy the same REs in a PRB and are multiplexed with orthogonal codes.

DMRS is precoded with the same precoder as the data. There is one reference signal transmitted per antenna port. An antenna port is defined such that the channel over which a symbol on the antenna port is conveyed can be inferred from the channel over which another symbol on the same antenna port is conveyed.

Similar to LTE, CSI-RS and DMRS will also be supported in NR for downlink channel estimation. In addition to periodic and aperiodic CSI-RS, semi-persistent CSI-RS transmission will also be supported in NR, in which CSI-RS transmission is dynamically activated and deactivated.

The Sounding Reference Symbol (SRS) is used for uplink channel quality measurements for frequency-selective scheduling and link adaption. SRS is also used for uplink timing estimation. In TDD systems, SRS can also be used in downlink channel estimation since the same carrier frequency is used in both downlink and uplink.

In LTE Frequency Division Duplexing (FDD), SRS is only transmitted by a UE in the last OFDM symbol of a subframe configured for SRS transmission for the UE. In LTE Time Division Duplexing (TDD), SRS is also transmitted in OFDM symbols in Uplink Pilot Time Slot (UpPTS) of special subframes. The location of SRS in a PRB in a normal SRS subframe is shown in FIG. 4, where DMRS are used for channel estimation in PUSCH demodulation.

The subframes in which SRS transmission can occur in a cell is referred to as cell specific SRS subframes. A UE can be configured to transmit SRS on a subset of the cell specific SRS subframes. An example is shown in FIG. 5, which is an example of cell specific and UE specific SRS subframes.

A UE can be configured with different SRS bandwidths. In general, two kinds of sounding bandwidths are supported, one is wideband and the other is narrowband. In case of wideband, channel measurement over the full system bandwidth can be performed in a single subframe. While in narrowband sounding, only part of the full system bandwidth can be measured in a subframe, thus multiple SRS subframes are needed for a full bandwidth channel measurement. Frequency hopping is supported for narrowband SRS so that different part of the frequency band can be measured in different subframes.

Furthermore, two types of sounding are supported, i.e. periodic (also referred to as type 0) and aperiodic (also referred to as type 1). In case of periodic SRS, a UE transmit SRS periodically at certain configured SRS subframes. In case of aperiodic SRS, a UE transmits SRS only when it is requested by Evolved or Enhanced Node B (eNB). The SRS subframes for periodic and aperiodic SRS are separately configured for a UE, both are within the cell specific SRS subframes.

The SRS bandwidth for a UE is configurable and is in the multiple of 4 PRBs. The minimum SRS bandwidth is 4 PRBs, which is also referred to as SRS subband. An example is shown in FIG. 6. In particular, FIG. 6 is an example of wideband and narrowband SRS with 10 MHz system bandwidth.

In case of narrowband SRS with Frequency Hopping (FH), a SRS is transmitted on different part of the system bandwidth at different SRS subframes. For example, for a 10 MHz system and SRS bandwidth of 4 PRBs, a possible set of locations in the frequency domain for SRS transmission are shown in FIG. 7. In this example, the whole bandwidth can be measured after 12 SRS subframes.

A SRS signal is a phase-shifted Zadoff-Chu sequence. Different UEs can be multiplexed on the same time-frequency resources by assigning different phase shifts, known as Cyclic Shifts (CS). There are 8 cyclic shifts defined. In addition, a SRS signal is only transmitted on half of the subcarriers in the configured SRS bandwidth, either even-numbered or odd-numbered subcarriers, configurable through a parameter called comb. This is also referred to as Interleaved Frequency Division Multiple Access (IFDMA) with a repetition factor of 2. Therefore, up to 16 UEs can be multiplexed on the same SRS bandwidth.

In LTE Release (Rel.) 13, support for 4-comb was also introduced, which means that a SRS signal can be mapped to every $4^{th}$ subcarrier, thereby increasing the SRS multiplexing capacity provided that the channel is sufficiently flat so that every $4^{th}$ subcarrier is adequate.

UEs with different SRS bandwidths can be multiplexed on a SRS subframe with different comb values. UEs with the same SRS bandwidth can be multiplexed in a SRS subframe with different cyclic shifts.

The UE transmit antenna selection has been a part of the LTE specification since Rel-8. UE informs eNB that it supports transmit antenna selection by setting the ue-TxAntennaSelectionSupported field to TRUE and includes the field in the UE-EUTRA-Capability information element. When eNB wants to enable antenna selection, it sets the ue-TransmitAntennaSelection field to closedLoop and includes the field in the AntennaInfo information element. When eNB wants to disable antenna selection, it should set ue-TransmitAntennaSelection field to NULL in the AntennaInfo information element.

For UEs with two transmit antennas, if SRS transmit Antenna Selection (AS) is supported and enabled for the UE, UE transmits SRS alternating between the two antenna ports if frequency hopping is not enabled.

FIG. 8 shows an example of SRS antenna selection with two transmit antenna ports (antenna ports with index 0 and 1). In FIG. 8, subband SRS is transmitted initially from antenna port 0. The next SRS is transmitted over different subband and from another antenna port. Antenna selection allows eNB to estimation DL channels for all antenna ports. However, it takes twice long for eNB to obtain channel estimation for both antenna ports assuming the same interval between two consecutive SRS transmissions. For example, it takes three SRS transmissions to cover the whole bandwidth (see FIG. 8) without antenna selection. However, it takes six SRS transmissions to cover the whole bandwidth for both antennas with antenna selection. It takes five SRS transmissions to get the channel estimation over the whole bandwidth for a single antenna when antenna selection is enabled.

SRS will also be supported in NR for uplink channel sounding. Similar to LTE, configurable SRS bandwidth is supported. SRS can be configurable with regard to density in frequency domain (e.g., comb levels) and/or in time domain (including multi-symbol SRS transmissions). In addition to full band size, partial band size is also supported in NR, which is smaller than the largest transmission bandwidth supported by the UE. For the full band size, the size is equal to the largest transmission bandwidth supported by the UE. Aperiodic SRS transmission triggered by the network is supported in NR. The triggering is generally done through DCI dynamically. Periodic and semi-persistent NR-SRS transmissions are also supported in NR.

In NR, a SRS resource comprises of a set of REs within a time duration and frequency span and N antenna ports (N≥1). A UE can be configured with K≥1 NR-SRS resources. The maximum value of K is considered to be a UE capability. Out of K≥1 configured NR-SRS resources, for aperiodic transmission, the UE can be configured to transmit a subset of or all K NR-SRS resources. For periodic and semi-persistent transmission, out of K≥1 configured SRS resources, the UE can be configured to transmit K SRS resources.

Antenna selection in NR is expected to be similar to that in LTE.

SUMMARY

Systems and methods for selectively enabling antenna selection at a wireless device for uplink sounding reference signal transmission in a Time Division Duplexing (TDD) wireless communication system are disclosed. Embodiments of a method of operation of a network node are disclosed. In some embodiments, a method of operation of a network node to selectively enable antenna selection at a wireless device for uplink sounding reference signal transmission in a TDD wireless communication system comprises making a determination as to whether to enable or disable antenna selection at a wireless device for transmission of uplink sounding reference signals based on: an estimated speed of movement of the wireless device; both the estimated speed of movement of the wireless device and a Signal to Interference plus Noise Ratio (SINR) for one or more downlink channels to the wireless device; or the estimated speed of movement of the wireless device, the SINR for the one or more downlink channels to the wireless device, and a rank used for downlink transmission to the wireless device. The method further comprises sending, to the wireless device, an indication that indicates whether the wireless device is to enable or disable antenna selection for transmission of uplink sounding reference signals in accordance with the determination.

In some embodiments, making the determination comprises making the determination as to whether to enable or disable antenna selection at the wireless device for transmission of uplink sounding reference signals based on the estimated speed of movement of the wireless device. In some other embodiments, making the determination comprises making the determination as to whether to enable or disable antenna selection at the wireless device for transmission of uplink sounding reference signals based on the estimated speed of movement of the wireless device and the SINR for the one or more downlink channels to the wireless device. In some other embodiments, making the determination comprises making the determination as to whether to enable or disable antenna selection at the wireless device for transmission of uplink sounding reference signals based on the estimated speed of movement of the wireless device, the SINR for the one or more downlink channels to the wireless device, and the rank used for downlink transmission to the wireless device.

In some embodiments, making the determination comprises obtaining the estimated speed of movement of the wireless device, determining whether the estimated speed of movement of the wireless device is less than a first speed threshold, and making the determination to enable antenna selection if the estimated speed of movement of the wireless device is less than the first speed threshold.

In some embodiments, making the determination further comprises making the determination to disable antenna selection if the estimated speed of movement of the wireless device is not less than the first speed threshold. In some other embodiments, making the determination further comprises, if the estimated speed of movement of the wireless device is not less than the first speed threshold, determining whether the speed of movement of the wireless device is greater than a second speed threshold that is greater than the first speed threshold, and making the determination to disable antenna selection if the speed of movement of the wireless device is greater than the second speed threshold.

In some embodiments, making the determination further comprises, if the estimated speed of movement of the wireless device is not less than the first speed threshold, determining whether the SINR for the one or more downlink channels to the wireless device is greater than a first SINR threshold and making the determination to disable antenna selection if the speed of movement of the wireless device is not less than the first speed threshold and the SINR for the one or more downlink channels to the wireless device is greater than the first SINR threshold.

In some embodiments, making the determination further comprises, if the estimated speed of movement of the wireless device is not less than the first speed threshold, determining whether the speed of movement of the wireless device is greater than a second speed threshold, determining whether the SINR for the one or more downlink channels to the wireless device is greater than a first SINR threshold, and making the determination to disable antenna selection if the speed of movement of the wireless device is greater than the second speed threshold and the SINR for the one or more downlink channels to the wireless device is greater than the first SINR threshold.

In some embodiments, making the determination further comprises, if the SINR of the one or more downlink channels to the wireless device is not greater than the first SINR threshold, making the determination to enable antenna selection. In some other embodiments, making the determination further comprises determining whether the SINR of the one or more downlink channels to the wireless device is less than a second SINR threshold and making the determination to enable antenna selection if the SINR of the one or more downlink channels to the wireless device is less than the second SINR threshold.

In some embodiments, making the determination further comprises, if the SINR of the one or more downlink channels to the wireless device is not greater than the first SINR threshold, making the determination to enable antenna selection if a reported rank of the wireless device is rank 1 and making the determination to disable antenna selection if the reported rank of the wireless device is greater than rank 1. In some other embodiments, making the determination further comprises determining whether the SINR of the one or more downlink channels to the wireless device is less than a second SINR threshold that is less than the first SINR threshold and, if the SINR of the one or more downlink channels to the wireless device is less than the second SINR threshold, making the determination to enable antenna selection if a reported rank of the wireless device is rank 1 and making the determination to disable antenna selection if the reported rank of the wireless device is greater than rank 1.

In some embodiments, the network node is a radio access node.

Embodiments of a network node are also disclosed. In some embodiments, a network node for selectively enabling antenna selection at a wireless device for uplink sounding reference signal transmission in a TDD wireless communication system comprises at least one processor and memory comprising instructions executable by the at least one processor whereby the network node is operable to make a determination as to whether to enable or disable antenna selection at a wireless device for transmission of uplink sounding reference signals and send, to the wireless device, an indication that indicates whether the wireless device is to enable or disable antenna selection for transmission of uplink sounding reference signals in accordance with the determination. The determination is made based on: an estimated speed of movement of the wireless device; both the estimated speed of movement of the wireless device and a SINR for one or more downlink channels to the wireless device; or the estimated speed of movement of the wireless device, the SINR for the one or more downlink channels to the wireless device, and a rank used for downlink transmission to the wireless device.

In some embodiments, the network node makes the determination as to whether to enable or disable antenna selection at the wireless device for transmission of uplink sounding reference signals based on the estimated speed of movement of the wireless device. In some other embodiments, the network node makes the determination as to whether to enable or disable antenna selection at the wireless device for transmission of uplink sounding reference signals based on the estimated speed of movement of the wireless device and the SINR for the one or more downlink channels to the wireless device. In some other embodiments, the network node makes the determination based on the estimated speed of movement of the wireless device, the SINR for the one or more downlink channels to the wireless device, and the rank used for downlink transmission to the wireless device.

In some embodiments, a network node for selectively enabling antenna selection at a wireless device for uplink sounding reference signal transmission in a TDD wireless communication system is adapted to make a determination as to whether to enable or disable antenna selection at a wireless device for transmission of uplink sounding reference signals and send, to the wireless device, an indication that indicates whether the wireless device is to enable or disable antenna selection for transmission of uplink sounding reference signals in accordance with the determination. The network node is adapted to make the determination based on: an estimated speed of movement of the wireless device; both the estimated speed of movement of the wireless device and a SINR for one or more downlink channels to the wireless device; or the estimated speed of movement of the wireless device, the SINR for the one or more downlink channels to the wireless device, and a rank used for downlink transmission to the wireless device.

In some embodiments, a network node for selectively enabling antenna selection at a wireless device for uplink sounding reference signal transmission in a TDD wireless communication system comprises a determining module and a sending module. The determining module is operable to make a determination as to whether to enable or disable antenna selection at a wireless device for transmission of uplink sounding reference signals based on: an estimated speed of movement of the wireless device; both the estimated speed of movement of the wireless device and a SINR for one or more downlink channels to the wireless device; or the estimated speed of movement of the wireless device, the SINR for the one or more downlink channels to the wireless device, and a rank used for downlink transmission to the wireless device. The sending module is operable to send, to the wireless device, an indication that indicates whether the wireless device is to enable or disable antenna selection for transmission of uplink sounding reference signals in accordance with the determination.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 6 illustrates an example of wideband and narrowband SRS with 10 Megahertz (MHz) system bandwidth;

FIG. 7 illustrates an example of a set of locations for SRS transmission with 4 PRB bandwidth;

DETAILED DESCRIPTION

Figure 1:
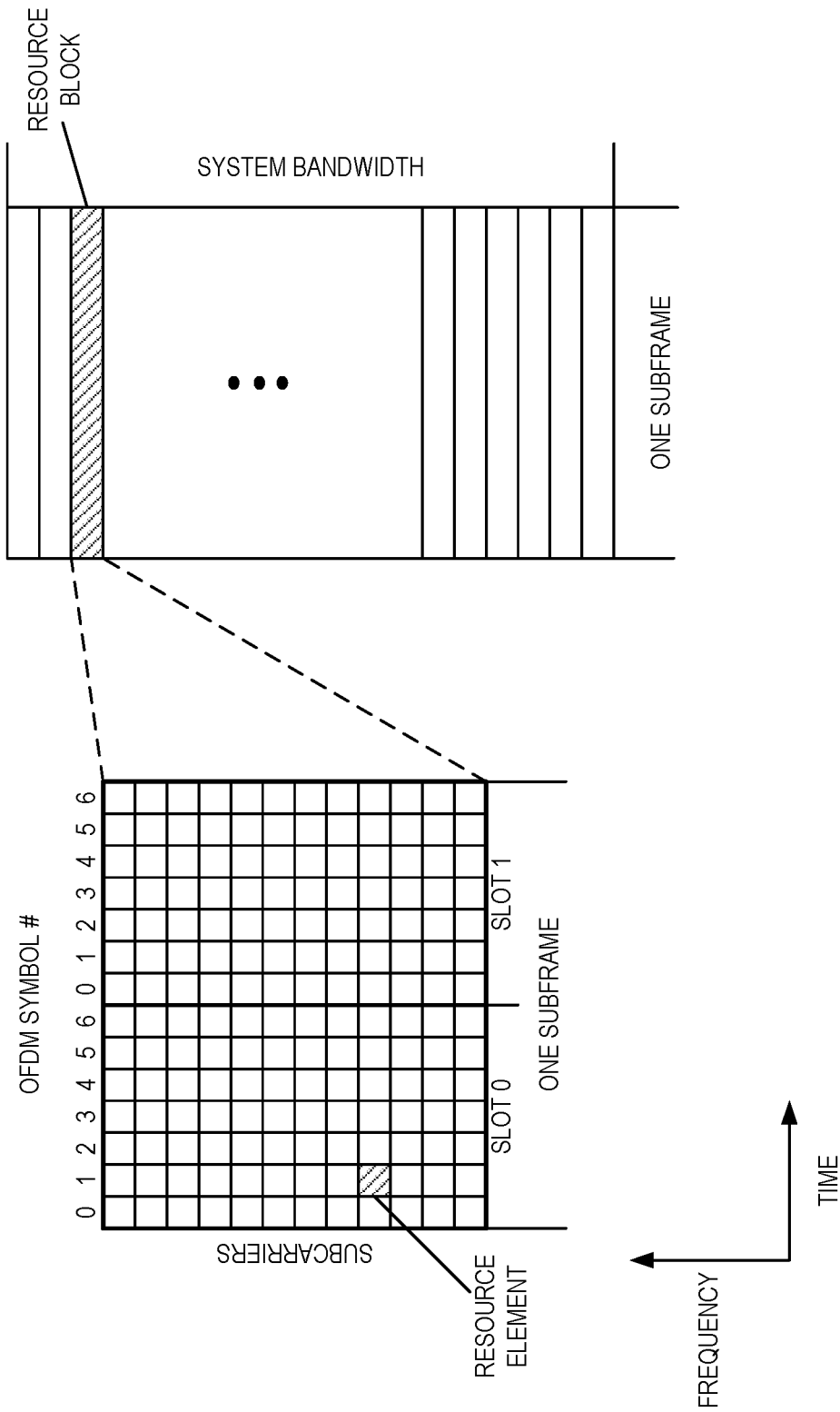
FIG. 1 illustrates a Long Term Evolution (LTE) time-frequency resource grid.
Figure 2:
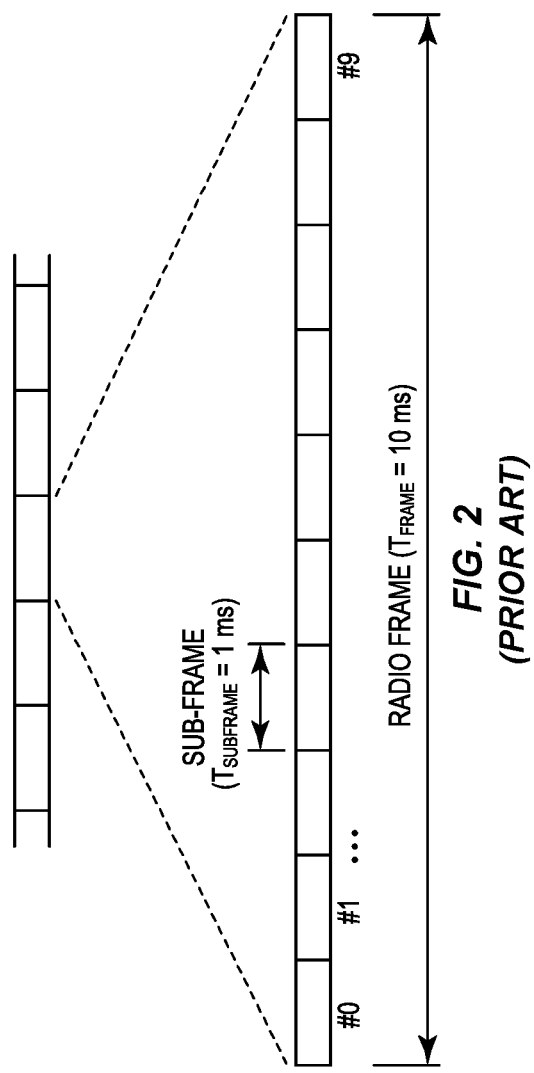
FIG. 2 illustrates a LTE time-domain structure.
Figure 3:
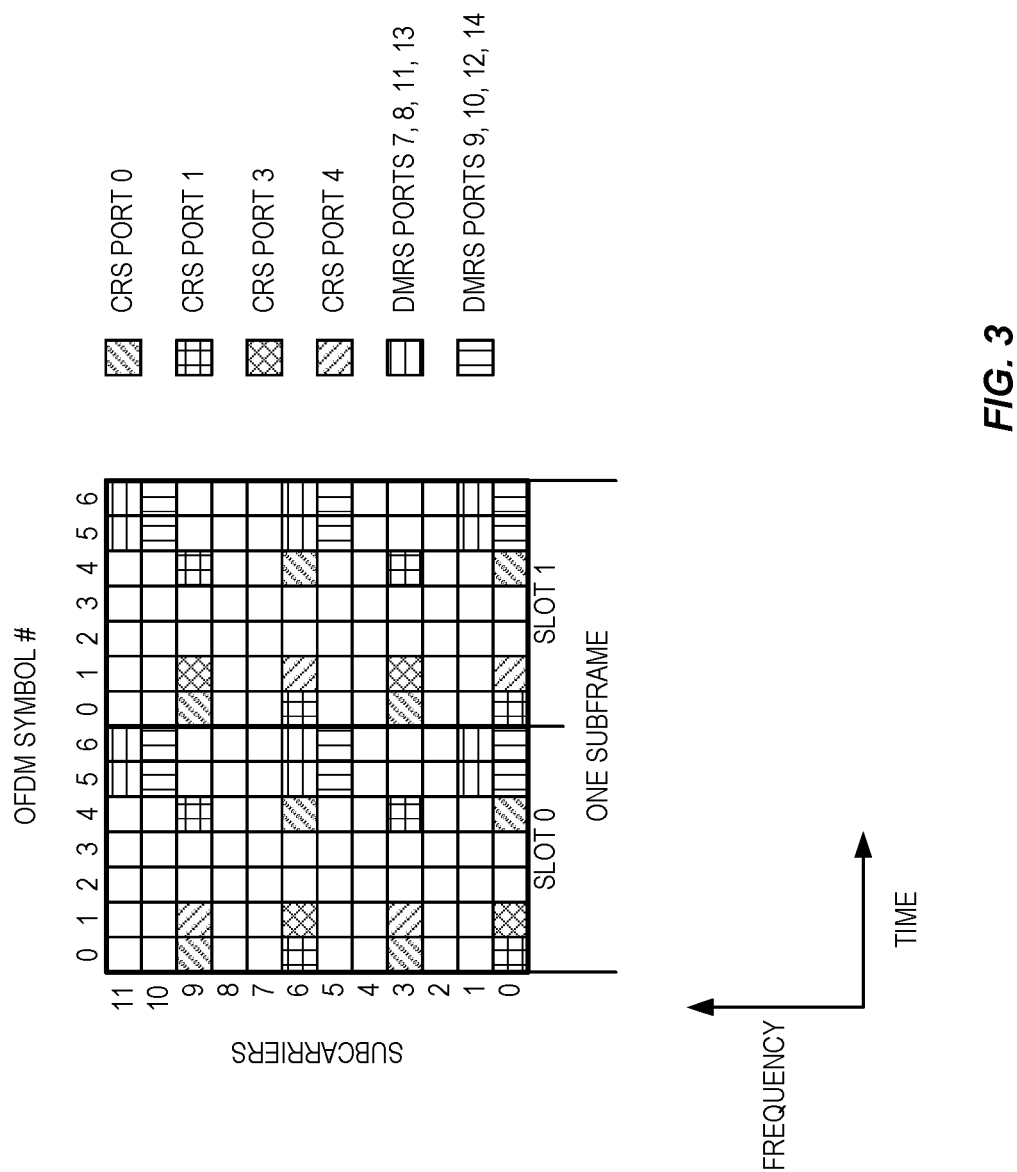
FIG. 3 illustrates Common Reference Signal (CRS) Resource and Demodulation Reference Signal (DMRS) Element (RE) patterns in a Physical Resource Block (PRB) in LTE.
Figure 4:
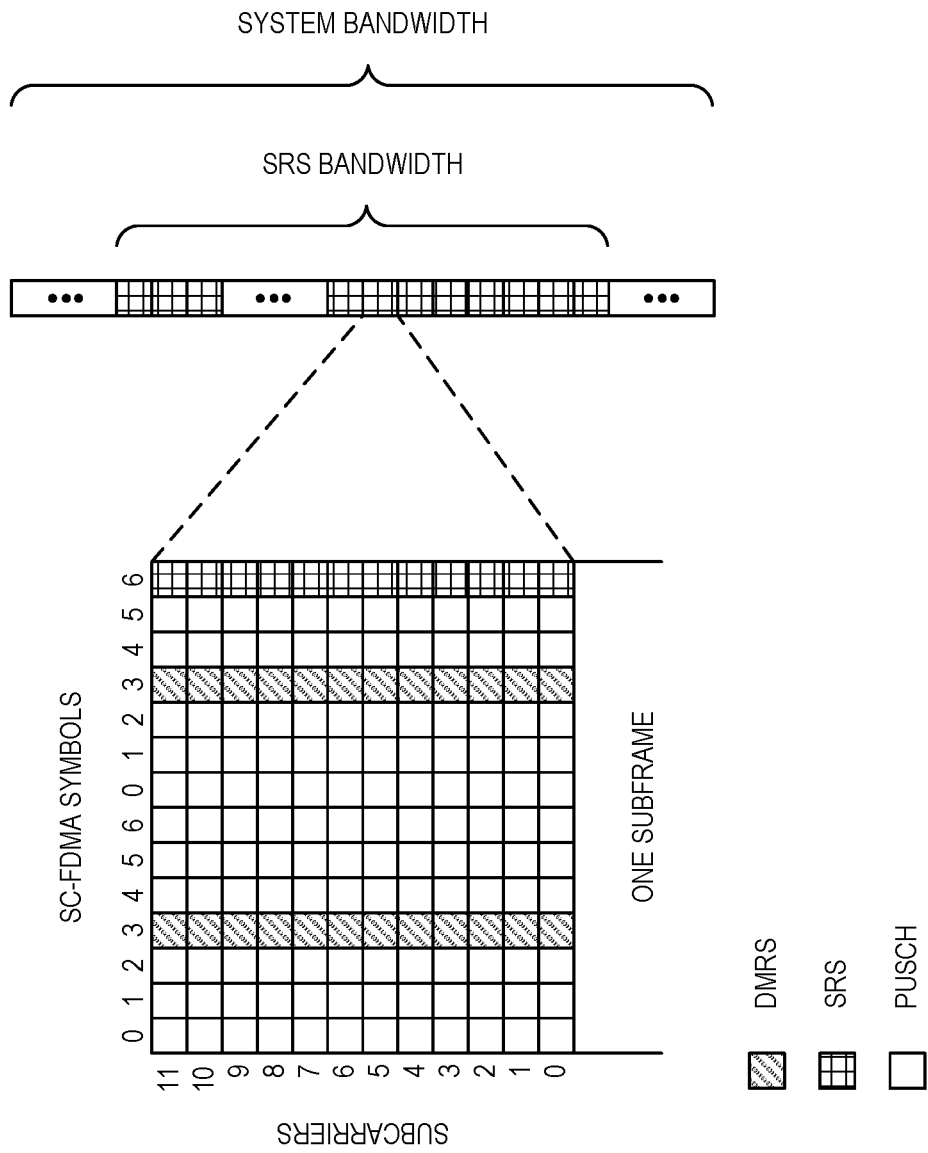
FIG. 4 illustrates SRS location in a PRB of a SRS subframe in LTE.
Figure 5:
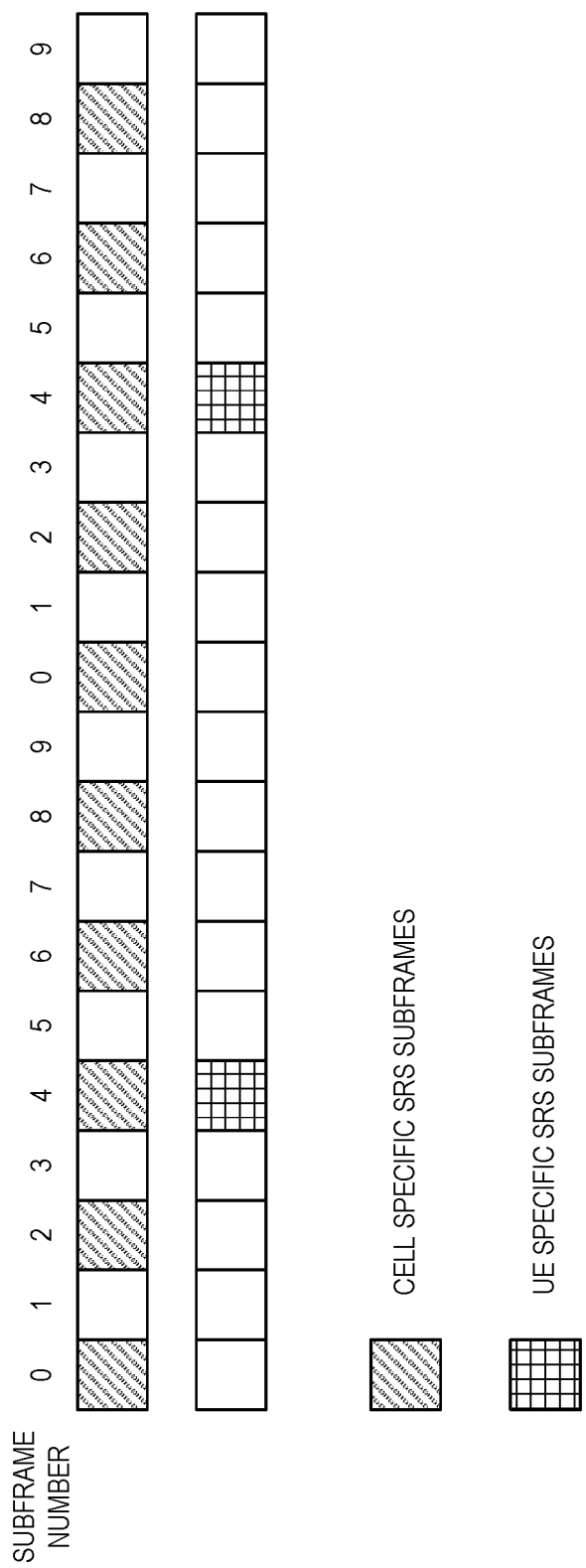
FIG. 5 illustrates an example of cell specific and UE specific SRS subframes.
Figure 8:
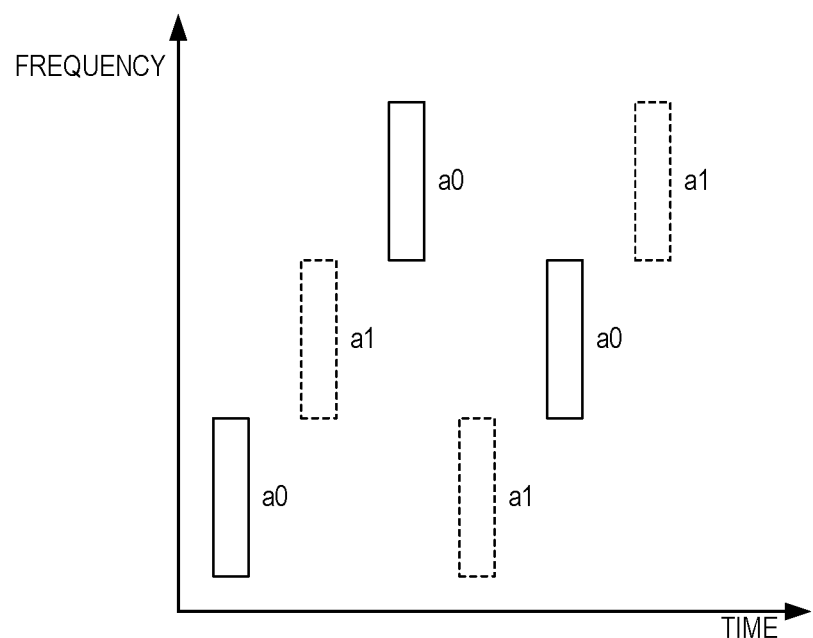
FIG. 8 illustrates an example of antenna selection.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods are disclosed herein that resolve some problems in downlink beamforming in a Time Division Duplexing (TDD) wireless communication system (e.g., a TDD cellular communications network such as, e.g., a TDD NR system) where downlink and uplink channels are reciprocal. Due to reciprocity, the downlink channel can be estimated based on an uplink Sounding Reference Signal (SRS).

If a wireless device (e.g., a UE) has only one transmit antenna but has two receive antennas, or if the wireless device has two transmit/receive antennas but does not support transmit antenna selection, the wireless device transmits SRS on one transmit antenna. In this case, the radio access node (e.g., eNB/gNB) can estimate the downlink channel for one receive antenna in the TDD system based on SRS. To perform downlink beamforming, the radio access node has to guess the downlink channel for the other wireless device antenna, or to guess the beamforming weights for the other wireless device antenna. In summary, once radio access node receives SRS transmissions over the whole bandwidth from one antenna, the radio access node can perform downlink beamforming for two receive antennas although the channel or weights for the other antenna are mainly based on guessing.

Figure 9:
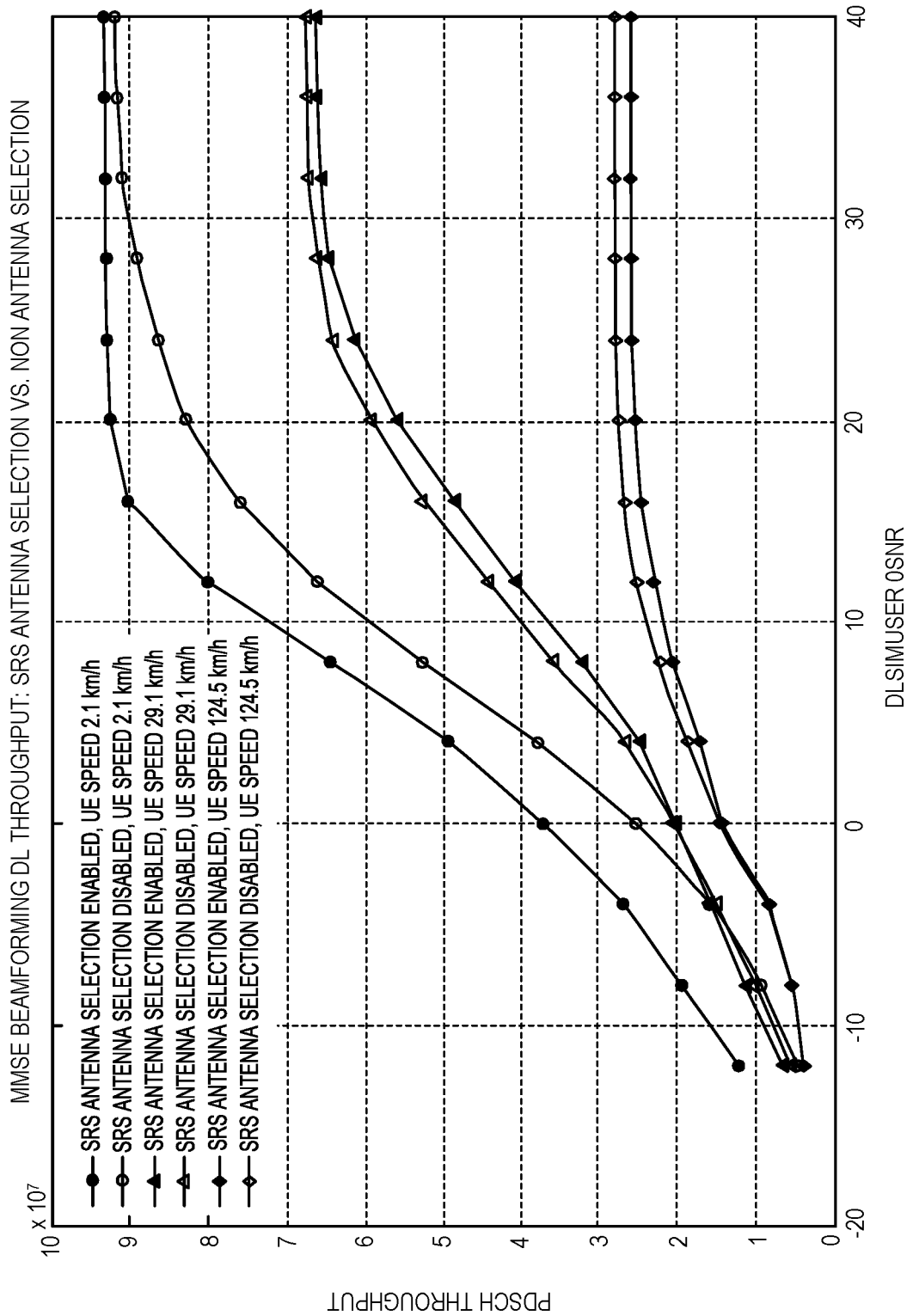
FIG. 9 illustrates simulated downlink throughput at different wireless device speeds when antenna selection is enabled and simulated downlink throughput at different wireless device speeds when antenna selection is disabled.

If a wireless device (e.g., UE) has multiple transmit antennas and supports antenna selection, the straightforward scheme to utilize the wireless device capability is to always enable transmit antenna selection since it would allow the radio access node (e.g., eNB/gNB) to estimate downlink channel information for all antennas. However, this simple scheme is not always optimal. As described above in the Background, it takes twice as long for the radio access node to obtain channel estimates for two antennas for wireless devices supporting antenna selection compared to obtaining a channel estimate for one antenna assuming the same time interval between two consecutive SRS transmissions. If the radio channel changes quickly, when the radio access node obtains channel estimates for both antennas over the full bandwidth, the channel information obtained based on earlier SRS transmissions may be outdated. That is, the increased effective SRS period will decrease channel estimation quality, which can lead to poor performance compared to channel estimation without antenna selection. FIG. 9 illustrates simulated downlink throughput at different wireless device speeds when antenna selection is enabled and simulated downlink throughput at different wireless device speeds when antenna selection is disabled. The simulation results in FIG. 9 show that disabling antenna selection actually provides better performance in medium and high speed cases. For purposes of the simulation, 2.1 Kilometers per Hour (km/hr) was utilized to represent low speed, 29.1 km/hr was utilized to represent medium speed, and 124.5 km/hr was utilized to represent high speed.

Of course, a shorter SRS period can be configured for SRS antenna selection to achieve the same effective SRS period per antenna. However, the SRS capacity will be reduced significantly.

Systems and methods are disclosed herein for dynamically enabling or disabling antenna selection dynamically for a wireless device having antenna selection capability. In some embodiments, antenna selection is enabled only when antenna selection is beneficial to network performance and/or user experience. In some embodiments, in order to determine whether antenna selection is beneficial, a network node (e.g., a radio access node such as, e.g., a eNB or gNB) making the determination considers many factors including the following: an estimated speed of movement of the wireless device, an estimated Signal to Interference plus Noise Ratios (SINR) for the downlink channel(s) to the wireless device, and/or a rank used for downlink transmission to the wireless device. In this manner, network performance is improved, i.e., cell and user throughput are improved.

Figure 10:
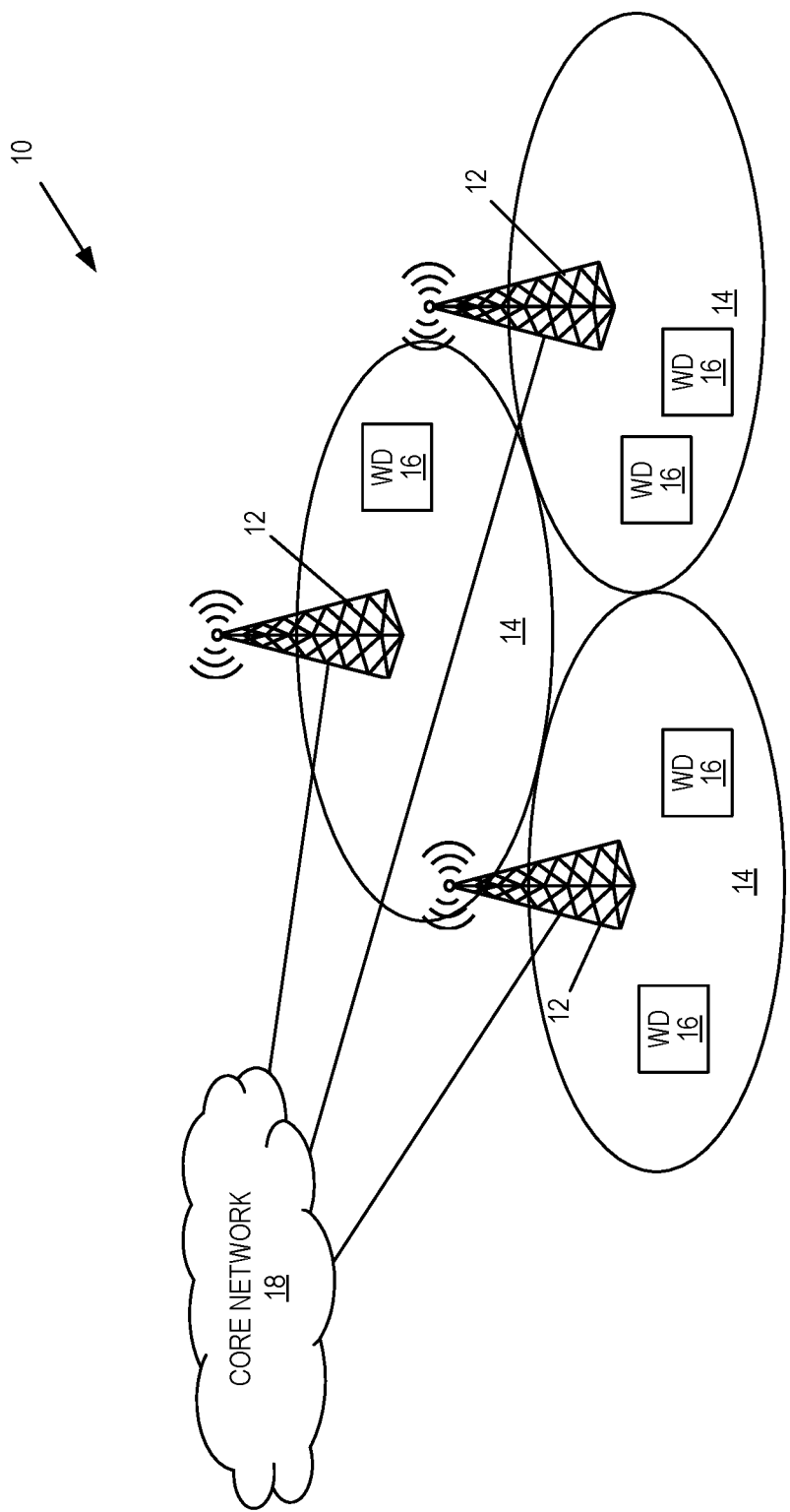
FIG. 10 illustrates one example of a wireless communication system in which embodiments of the present disclosure may be implemented.

FIG. 10 illustrates one example of a wireless communication system 10 in which embodiments of the present disclosure may be implemented. In some embodiments, the wireless communication system 10 is a cellular communications system such as, e.g., a NR cellular communications system. The wireless communication system 10 includes a number of radio access nodes 12 serving corresponding cells 14 and providing radio access to a number of wireless devices 16. The radio access nodes 12 are connected to a core network 18. In embodiments in which the wireless communication system 10 is a NR system, the radio access nodes 12 are gNBs.

The wireless communication system 10 is a TDD system in which downlink and uplink channels are reciprocal. Due to this reciprocity, the downlink channel between the radio access node 12 and a particular antenna of the wireless device 16 can be estimated based on an uplink SRS transmitted from that antenna.

As discussed below, antenna selection used for transmission of uplink SRS for the wireless device 16 having antenna selection capability is dynamically enabled or disabled based on one or more criteria to thereby provided improved network performance. In some embodiments, the determination as to whether to enable or disable antenna selection is made by a network node such as, for example, the radio access node 12. Note, however, that this determination may alternatively be made by a network node other than the radio access node 12.

Figure 11:
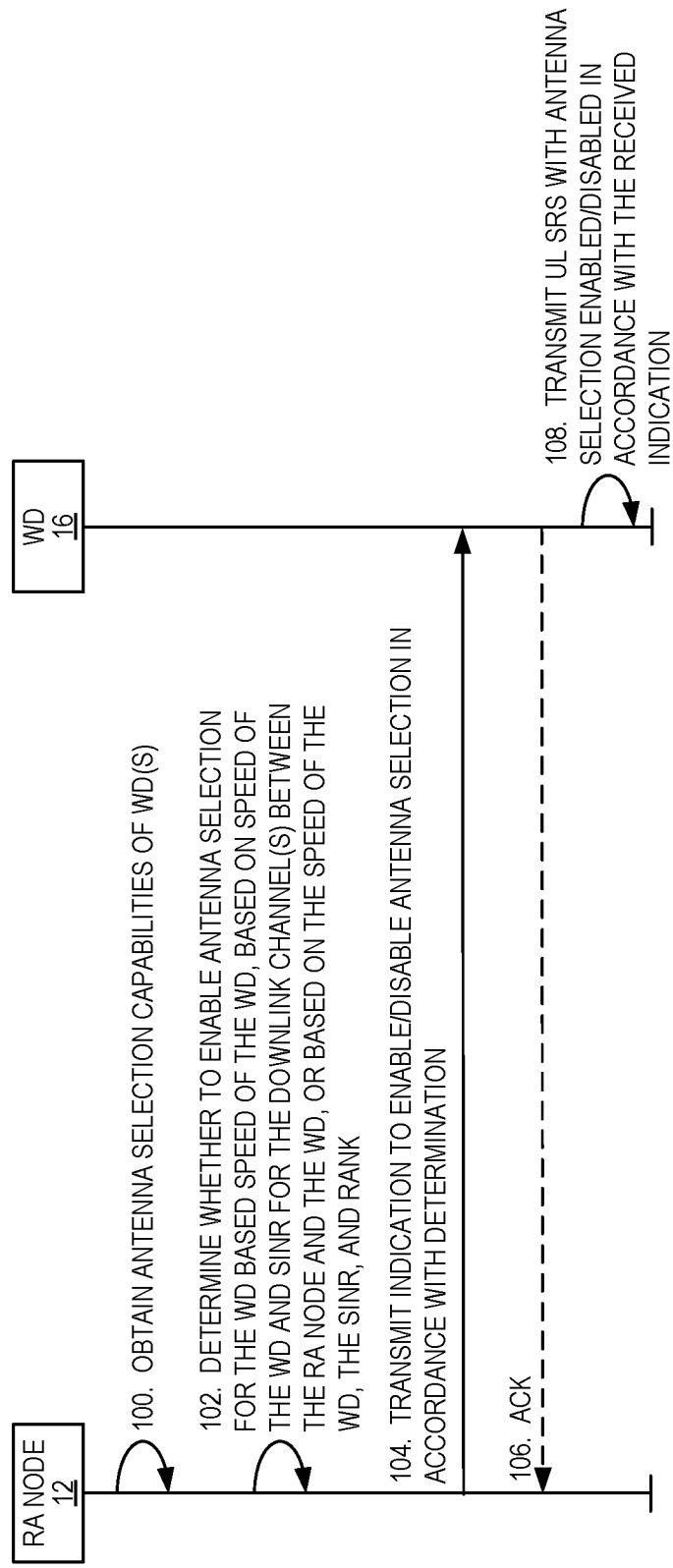
FIG. 11 illustrates the operation a radio access node and a wireless device to provide dynamic antenna selection according to some embodiments of the present disclosure.

In this regard, FIG. 11 illustrates the operation of the radio access node 12 and the wireless device 16 according to some embodiments of the present disclosure. As illustrated, the radio access node 12 first obtains capability information for the wireless device 16 that indicates whether the wireless device 16 has antenna selection capability (step 100). This capability information may be obtained from the wireless device 16, from another network node, or from local memory or storage at the radio access node 12. Further, the capability information may explicitly or implicitly indicate whether the wireless device 16 has antenna selection capability. Note that step 100 is optional. For example, in some embodiments, all wireless devices 16 have or can be assumed to have antenna selection capability.

The radio access node 12 makes a determination as to whether to enable or disable antenna selection for uplink SRS transmission at the wireless device 16 (step 102). Depending on the particular embodiment, this determination is made based on an estimated speed of movement of the wireless device 16, based on an estimated speed of movement of the wireless device 16 and a downlink SINR for the downlink channel(s) from the radio access node 12 to the wireless device 16, or based on an estimated speed of movement of the wireless device 16, a downlink SINR for the downlink channel(s) from the radio access node 12 to the wireless device 16, and a rank used for downlink transmission to the wireless device 16.

For example, looking briefly back at the simulation results illustrated in FIG. 9, it can be seen that network performance can be improved by enabling antenna selection if the speed of movement of the wireless device 16 is low (e.g., less than some threshold such as, e.g., 10 km/hr) and disabling antenna selection if the speed of movement of the wireless device 16 is medium or high (e.g., greater than some threshold such as, e.g., 10 km/hr, 20 km/hr, 50 km/hr, 75 km/hr, 100 km/hr, or 125 km/hr). Still further, it can be seen that both the speed of movement of the wireless device 16 and downlink SINR can be considered in some embodiments to improve network performance.

Returning to FIG. 11, once the determination has been made, the radio access node 12 sends an indication to the wireless device 16 to enable or disable antenna selection in accordance with the determination (step 104). If the decision is to enable antenna selection while it is already enabled on the wireless device 16, then the indication to the wireless device 16 to enable antenna selection is not needed. Similarly, if the decision is to disable antenna selection while it is already disabled on the wireless device 16, the indication to the wireless device 16 to disable antenna selection is not needed. Thus, in some embodiments, step 104 is performed only if a change in the antenna selection mode is needed (e.g., send the indication if a decision is made to enable antenna selection and antenna selection is currently disabled at the wireless device 16 but not if antenna selection is already enabled at the wireless device 16). In some embodiments, the indication is provided via a Radio Resource Control (RRC) message sent to the wireless device 16. In some embodiments, the wireless device 16 confirms the start of transmit antenna selection by replying to radio access node 12, e.g., via another RRC message. The indication is preferably a dynamic indication. In other words, as conditions change, the radio access node 12 updates the determination in step 102 and sends the appropriate indication to the wireless device 16 in step 104. Note that, in some embodiments, the radio access node 12 sends the indication each time the determination is made; however, in some other embodiments, the radio access node 12 only sends the indication when needed to change the state of antenna selection from enabled to disabled or vice versa. The wireless device 16 receives the indication, sends an acknowledgment (step 106), and transmits uplink SRS with antenna selection enabled or disabled in accordance with the received indication (step 108). Note that, as an example, the enabling/disabling of antenna selection is via RRCConnectionReconfiguration message, and the acknowledgement is a RRCConnectionReconfigurationComplete message. However, this is only an example. Further, in some implementations, the acknowledgement may be optional.

Figure 12:
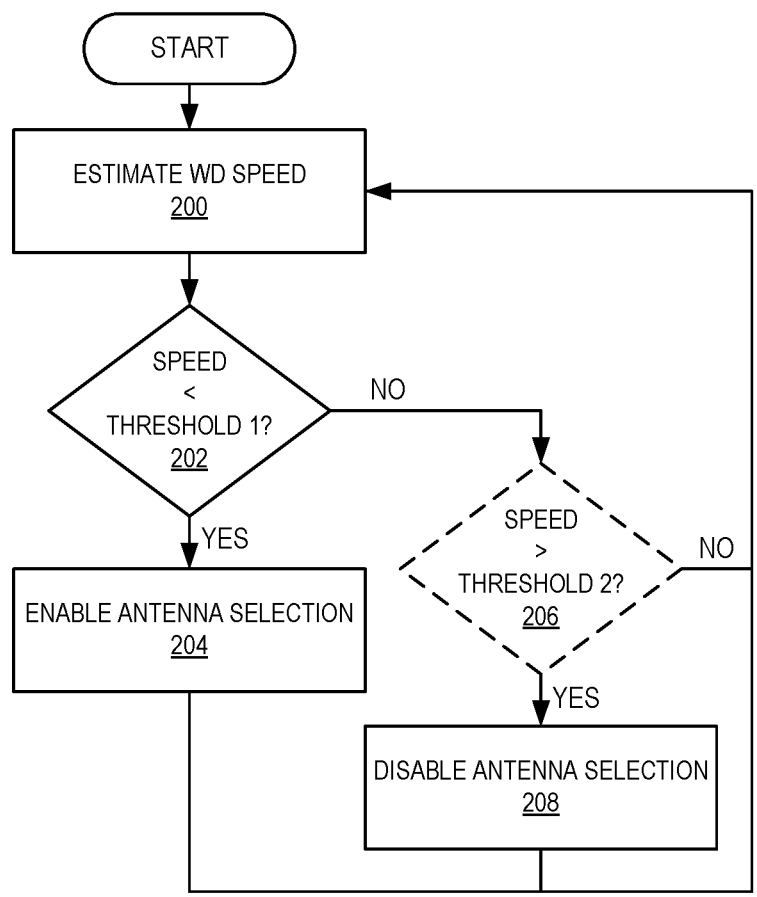
FIG. 12 is a flow chart that illustrates a process performed by a network node to make the determination as to whether to enable or disable antenna selection based on the speed of the wireless device according to some embodiments of the present disclosure.

FIG. 12 is a flow chart that illustrates a process performed by a network node (e.g., the radio access node 12) to make the determination as to whether to enable or disable antenna selection based on the estimated speed of movement of the wireless device 16 according to some embodiments of the present disclosure. This process is one example of a more detailed implementation of step 102 of FIG. 11. Optional steps are represented by dashed boxes.

As illustrated, the network node estimates the speed of movement of the wireless device 16 (step 200). The network node may directly estimate the speed of the wireless device 16 or obtain the estimated speed of the wireless device 16 from, e.g., another network node. In some embodiments, after radio connection is established between the wireless device 16 and the radio access node 12, the radio access node 12 checks the capability of the wireless device 16 to see if the wireless device 16 supports transmit antenna selection. If transmit antenna selection is supported, the radio access node 12 estimates the speed of movement of the wireless device 16. Note that the radio access node 12 continues to estimate the speed of the wireless device 16, e.g., periodically or continuously.

The radio access node 12 then determines whether to enable or disable antenna selection based on the estimated speed of the wireless device 16. Specifically, in this example, the radio access node 12 determines whether the estimated speed of the wireless device 16 is below a predefined threshold (step 202). The predefined threshold may be a predefined threshold for low mobility wireless devices. While not being limited to any particular value, as some examples, the predefined threshold may be, e.g., 5 km/hr, 10 km/hr, 15 km/hr, or 20 km/hr. If the estimated speed of the wireless device 16 is below the predefined threshold (step 202, YES), the network node makes the determination to enable antenna selection for the wireless device 16 (step 204). As discussed above, upon making this determination, the network node (e.g., the radio access node 12) sends an indication to enable antenna selection to the wireless device 16 if antenna selection has not been enabled yet. Once antenna selection is enabled, the process returns to step 200 where the network node continues to monitor the speed of the wireless device 16. If the estimated speed of the wireless device 16 is not less than the predefined threshold (step 202, NO), the network node determines whether the speed of the wireless device 16 is greater than another predefined threshold, which is greater than the predefined threshold used in step 202 (step 206). If so, the network node makes the determination to disable antenna selection for the wireless device 16 (step 208). Upon making the determination to disable antenna selection, the network node sends the appropriate indication to the wireless device 16 if antenna selection is currently enabled, as discussed above. Note that step 206 is optional. For instance, in one alternative embodiment, the network node makes the determination to disable antenna selection if the speed of the wireless device 16 is not less than the predefined threshold in step 202. Upon disabling antenna selection, the process returns to step 200. Note that the estimated speed of the wireless device 16 is filtered, in some embodiments, in order to minimize the transitions between the two states for antenna selection (i.e., to minimize transitions between enabling and disabling antenna selection).

In some other embodiments, the network node makes the determination as to whether to enable or disable antenna selection at the wireless device 16 based on both the speed of the wireless device 16 and the downlink SINR. Looking briefly at the simulation results of FIG. 9, it can be seen that, for medium and high mobility scenarios, performance may be improved by disabling antenna selection at moderate to high SINR values but not at low SINR values.

Figure 13:
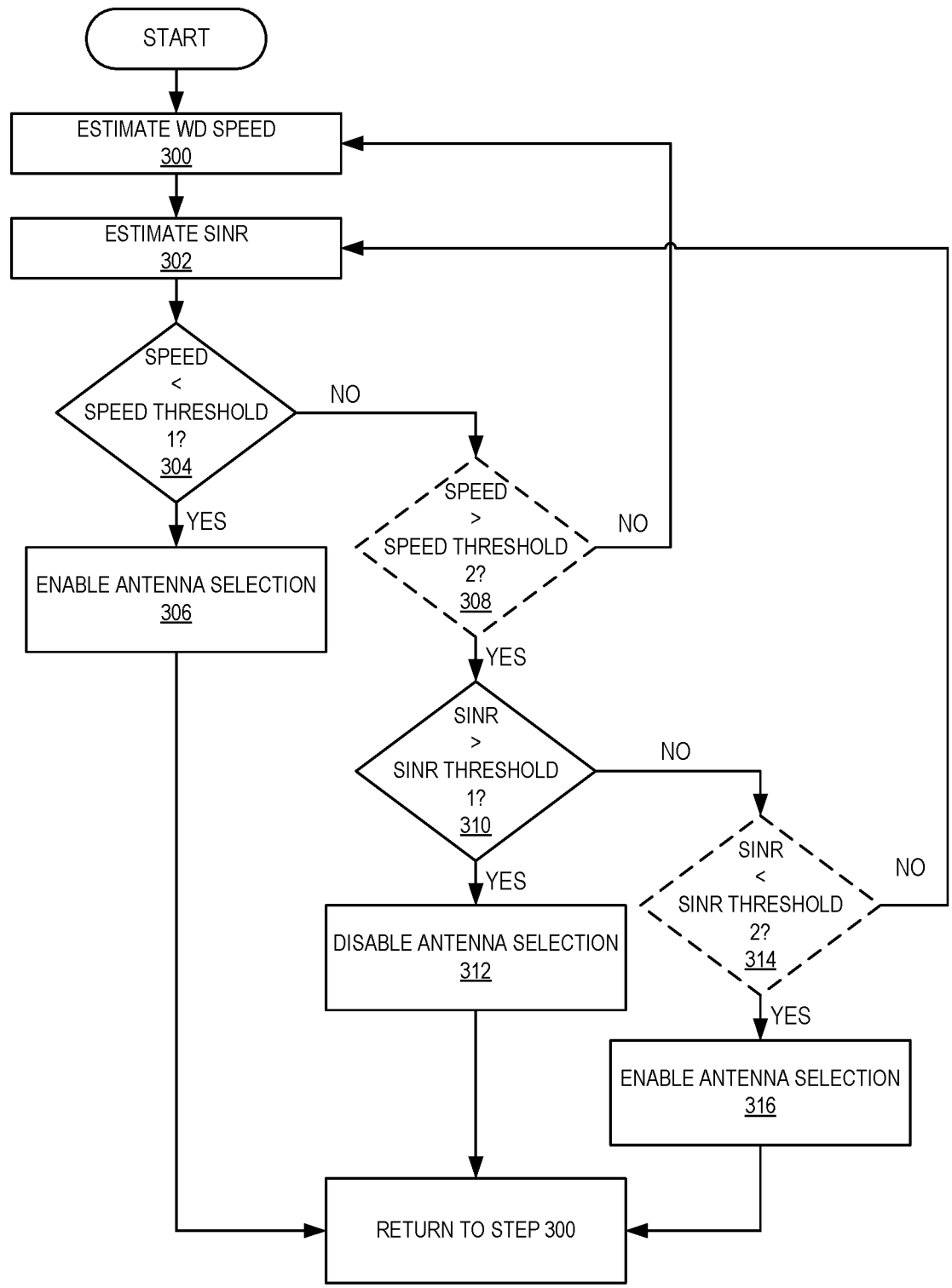
FIG. 13 is a flow chart that illustrates a process performed by a network node to make the determination as to whether to enable or disable antenna selection based on the speed of the wireless device and a downlink Signal to Interference plus Noise Ratio (SINR) for the wireless device according to some embodiments of the present disclosure.

In this regard, FIG. 13 illustrates a flow chart for a process performed by a network node (e.g., the radio access node 12) to make the determination as to whether to enable or disable antenna selection based on both the speed of the wireless device 16 and downlink SINR according to some embodiments of the present disclosure. This process is one example of a more detailed implementation of step 102 of FIG. 11. Optional steps are represented by dashed boxes.

As illustrated, the network node estimates the speed of movement of the wireless device 16 (step 300). The network node may directly estimate the speed of the wireless device 16 or obtain the estimate of the speed of the wireless device 16 from, e.g., another network node. In addition, the network node estimates the downlink SINR for one or more downlink channels to the wireless device 16 (step 302). The network node may directly determine the SINR or obtain the SINR from, e.g., another network node. In some embodiments, after radio connection is established between the wireless device 16 and the radio access node 12, the radio access node 12 checks the capability of the wireless device 16 to see if the wireless device 16 supports transmit antenna selection. If transmit antenna selection is supported, the radio access node 12 estimates the speed of movement of the wireless device 16 and the SINR of the one or more downlink channels to the wireless device 16. Note that the radio access node 12 continues to estimate the speed of the wireless device 16 and the SINR of the downlink channels to the wireless device 16, e.g., periodically or continuously.

The radio access node 12 then determines whether to enable or disable antenna selection based on the estimated speed of the wireless device 16 and the downlink SINR of the downlink channel(s) to the wireless device 16. Specifically, in this example, the radio access node 12 determines whether the estimated speed of the wireless device 16 is below a predefined threshold (step 304). The predefined threshold may be a predefined threshold for low mobility wireless devices. While not being limited to any particular value, as some examples, the predefined threshold may be, e.g., 5 km/hr, 10 km/hr, 15 km/hr, or 20 km/hr. If the estimated speed of the wireless device 16 is below the predefined threshold (step 304, YES), the network node makes the determination to enable antenna selection for the wireless device 16 (step 306). As discussed above, upon making this determination, the network node (e.g., the radio access node 12) sends an indication to enable antenna selection to the wireless device 16 if antenna selection has not been enabled yet. Once antenna selection is enabled, the process returns to step 300 where the network node continues to monitor the speed of the wireless device 16.

If the estimated speed of the wireless device 16 is not less than the predefined threshold (step 304, NO), the network node determines whether the speed of the wireless device 16 is greater than another predefined threshold, which is greater than the predefined threshold used in step 304 (step 308). This second predefined threshold may be, e.g., a predefined threshold for high mobility wireless devices (e.g., a threshold of 10 km/hr, 20 km/hr, 30 km/hr, or 40 km/hr). If the speed of the wireless device 16 is not greater than the second predefined threshold (step 308, NO), the process returns to step 300. If the speed of the wireless device 16 is greater than the second predefined threshold (step 308, YES), the network node determines whether the downlink SINR is greater than a predefined SINR threshold (step 310). The predefined SINR threshold may be, e.g., 0 dB. Note, however, that the optimal value for the SINR threshold can be determined based on simulations and/or testing. If the downlink SINR is greater than the predefined SINR threshold (step 310, YES), the network node makes the determination to disable antenna selection for the wireless device 16 (step 312). Upon making the determination to disable antenna selection, the network node sends the appropriate indication to the wireless device 16 when needed, as discussed above. Upon disabling antenna selection, the process returns to step 300.

If the downlink SINR is not greater than the predefined threshold (step 310, NO), the network node determines whether the downlink SINR is less than a second predefined SINR threshold (step 314). The second predefined SINR threshold is, in some embodiments, the same as the first predefined SINR threshold. In some other embodiments, the second predefined SINR threshold is lower than the first predefined SINR threshold (e.g., −5 dB), which may be desirable to minimize ping-pong switches and thus minimize RRC signaling traffic. If the downlink SINR is not less than the second predefined SINR threshold (step 314, NO), the process returns to step 302. If the downlink SINR is less than the second predefined SINR threshold (step 314, YES), the network node makes the determination to enable antenna selection for the wireless device 16 (step 316). Upon making the determination to enable antenna selection, the network node sends the appropriate indication to the wireless device 16, as discussed above. Upon enabling antenna selection, the process returns to step 300.

Note that the estimated speed of the wireless device 16 is filtered, in some embodiments, in order to minimize the transitions between the two states for antenna selection (i.e., to minimize transitions between enabling and disabling antenna selection).

Figure 14A:
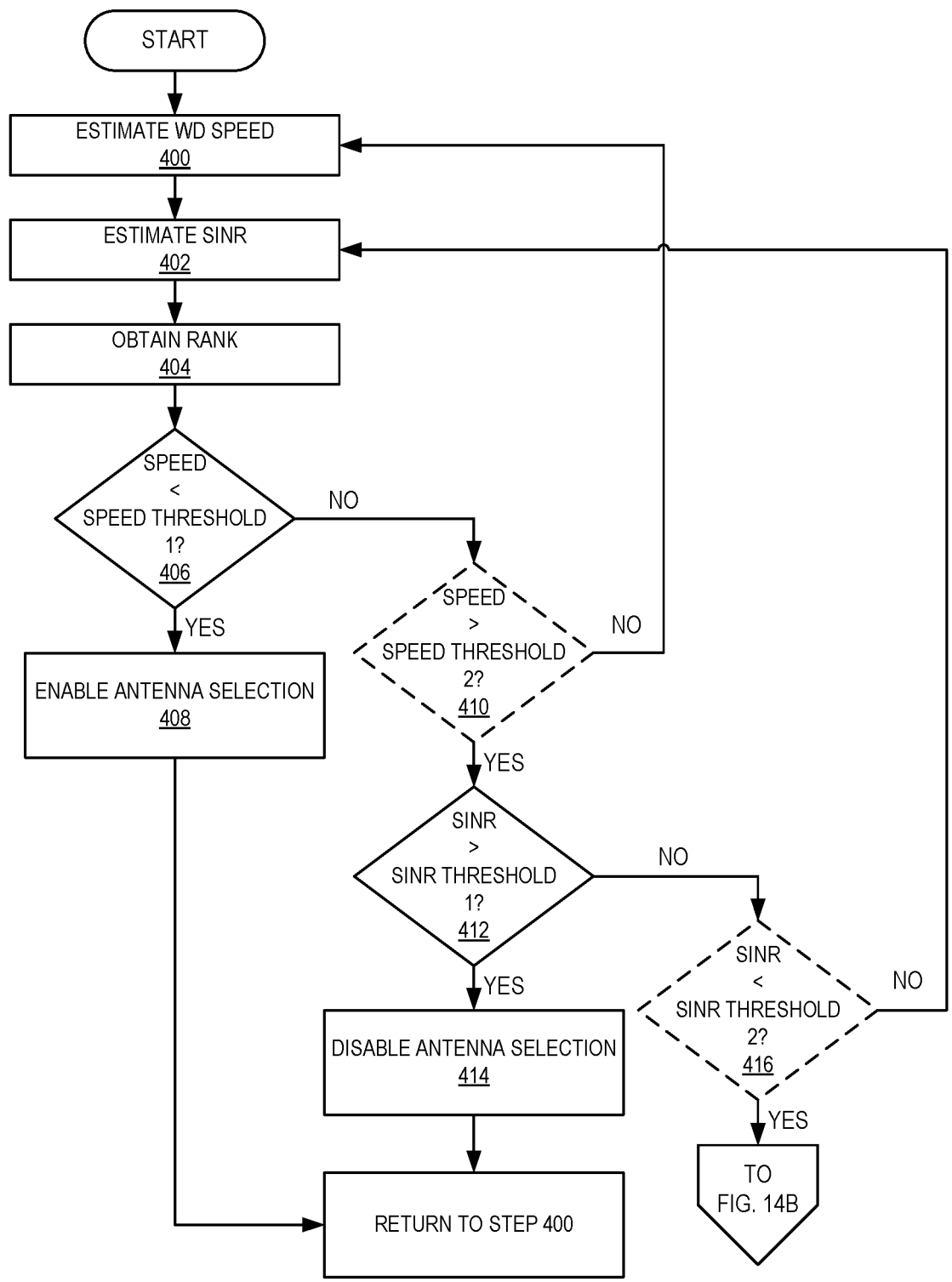
FIGS. 14A and 14B illustrate a flow chart for a process performed by a network node to make the determination as to whether to enable or disable antenna selection based on both the speed of the wireless device, downlink SINR for the wireless device, and rank according to some embodiments of the present disclosure.
Figure 14B:
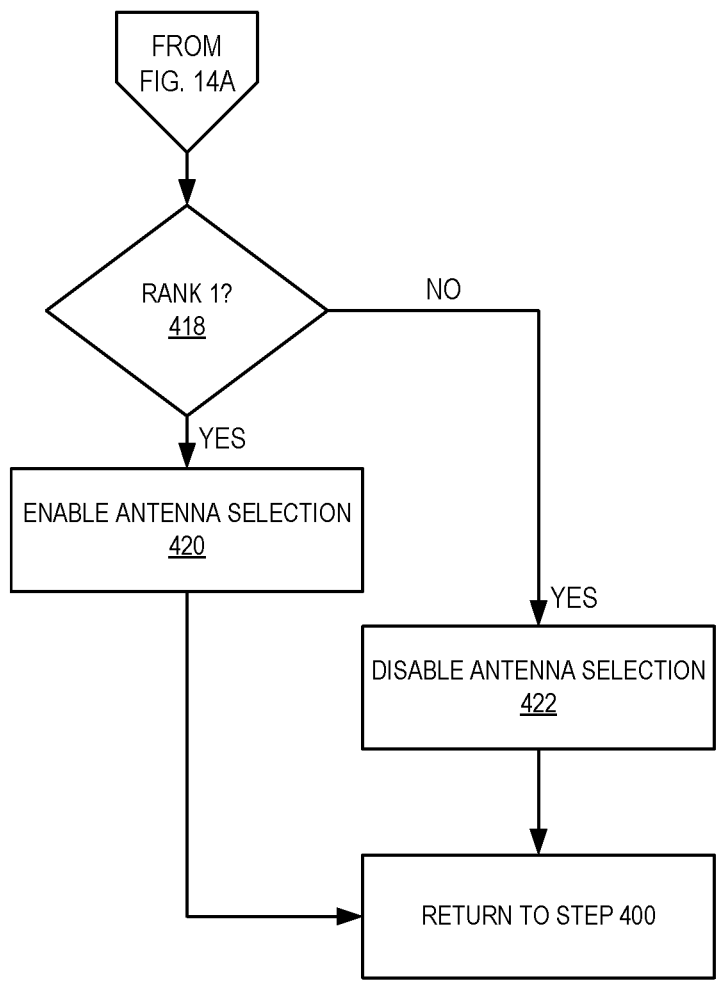

In some other embodiments, the network node makes the determination as to whether to enable or disable antenna selection at the wireless device 16 based on the speed of the wireless device 16, the downlink SINR, and rank. In this regard, FIGS. 14A and 14B illustrate a flow chart for a process performed by a network node to make the determination as to whether to enable or disable antenna selection based on the speed of the wireless device 16, downlink SINR, and rank according to some embodiments of the present disclosure. This process is one example of a more detailed implementation of step 102 of FIG. 11. Optional steps are represented by dashed boxes.

As illustrated, the network node estimates the speed of movement of the wireless device 16 (step 400). The network node may directly estimate the speed of the wireless device 16 or obtain the estimate of the speed of the wireless device 16 from, e.g., another network node. In addition, the network node estimates the downlink SINR for one or more downlink channels to the wireless device 16 (step 402). The network node may directly determine the SINR or obtain the SINR from, e.g., another network node. The network node also obtains the rank used for downlink transmission to the wireless device 16 (step 404). More specifically, in some embodiments, the wireless device 16 reports rank to the radio access node 12, e.g., as part of reported Channel State Information (CSI). Note, however, that the actual rank used can be different than that reported. In some embodiments, after radio connection is established between the wireless device 16 and the radio access node 12, the radio access node 12 checks the capability of the wireless device 16 to see if the wireless device 16 supports transmit antenna selection. If transmit antenna selection is supported, the radio access node 12 estimates the speed of movement of the wireless device 16 and the SINR of the one or more downlink channels to the wireless device 16. Note that the radio access node 12 continues to estimate the speed of the wireless device 16 and the SINR of the downlink channels to the wireless device 16, e.g., periodically or continuously.

The radio access node 12 then determines whether to enable or disable antenna selection based on the estimated speed of the wireless device 16, the downlink SINR of the downlink channel(s) to the wireless device 16, and the rank. Specifically, in this example, the radio access node 12 determines whether the estimated speed of the wireless device 16 is below a predefined threshold (step 406). The predefined threshold may be a predefined threshold for low mobility wireless devices. While not being limited to any particular value, as some examples, the predefined threshold may be, e.g., 5 km/hr, 10 km/hr, 15 km/hr, or 20 km/hr. If the estimated speed of the wireless device 16 is below the predefined threshold (step 406, YES), the network node makes the determination to enable antenna selection for the wireless device 16 (step 408). As discussed above, upon making this determination, the network node (e.g., the radio access node 12) sends an indication to enable antenna selection to the wireless device 16. Once antenna selection is enabled, the process returns to step 400 where the network node continues to monitor the speed of the wireless device 16.

If the estimated speed of the wireless device 16 is not less than the predefined threshold (step 406, NO), the network node determines whether the speed of the wireless device 16 is greater than another predefined threshold, which is greater than the predefined threshold used in step 406 (step 410). This second predefined threshold may be a predefined threshold for high mobility wireless devices (e.g., a threshold of 50 km/hr, 75 km/hr, 100 km/hr, or 125 km/hr). If the speed of the wireless device 16 is not greater than the second predefined threshold (step 410, NO), the process returns to step 400. If the speed of the wireless device 16 is greater than the second predefined threshold (step 410, YES), the network node determines whether the downlink SINR for the wireless device 16 is greater than a first predefined SINR threshold (step 412). The first predefined SINR threshold may be, e.g., 0 dB, but the optimal value may be determined by simulations and/or testing. If the downlink SINR for the wireless device 16 is greater than the first predefined SINR threshold (step 412, YES), the network node makes the determination to disable antenna selection for the wireless device 16 (step 414). Upon making the determination to disable antenna selection, the network node sends the appropriate indication to the wireless device 16, as discussed above. Upon disabling antenna selection, the process returns to step 400.

If the downlink SINR for the wireless device 16 is not greater than the first predefined SINR threshold (step 412, NO), the network node then determines whether the downlink SINR is less than a second predefined SINR threshold (step 416). The second predefined SINR threshold is, in some embodiments, the same as the first predefined SINR threshold. In some other embodiments, the second predefined SINR threshold is lower than the first predefined SINR threshold (e.g., −5 dB), which may be desirable to minimize ping-pong switches and thus minimize RRC signaling traffic. If the downlink SINR is not less than the second predefined SINR threshold (step 416, NO), the process returns to step 402. If the downlink SINR is less than the second predefined SINR threshold (step 416, YES), the network node determines whether rank 1 will be used for later Physical Downlink Shared Channel (PDSCH) transmission for the wireless device 16 (step 418). If rank 1 is used (step 418, YES), the network node makes the determination to enable antenna selection for the wireless device 16 (step 420). Upon making the determination to enable antenna selection, the network node sends the appropriate indication to the wireless device 16, as discussed above. Upon enabling antenna selection, the process returns to step 400.

If a rank higher than 1 will be used for later PDSCH transmission for the wireless device 16 (step 418, NO), the network node makes the determination to disable antenna selection for the wireless device 16 (step 422). Upon making the determination to disable antenna selection, the network node sends the appropriate indication to the wireless device 16, as discussed above. Upon disabling antenna selection, the process returns to step 400.

Note that the estimated speed of the wireless device 16 and the estimated SINR are filtered, in some embodiments, in order to minimize the transitions between the two states for antenna selection (i.e., to minimize transitions between enabling and disabling antenna selection).

Figure 15:
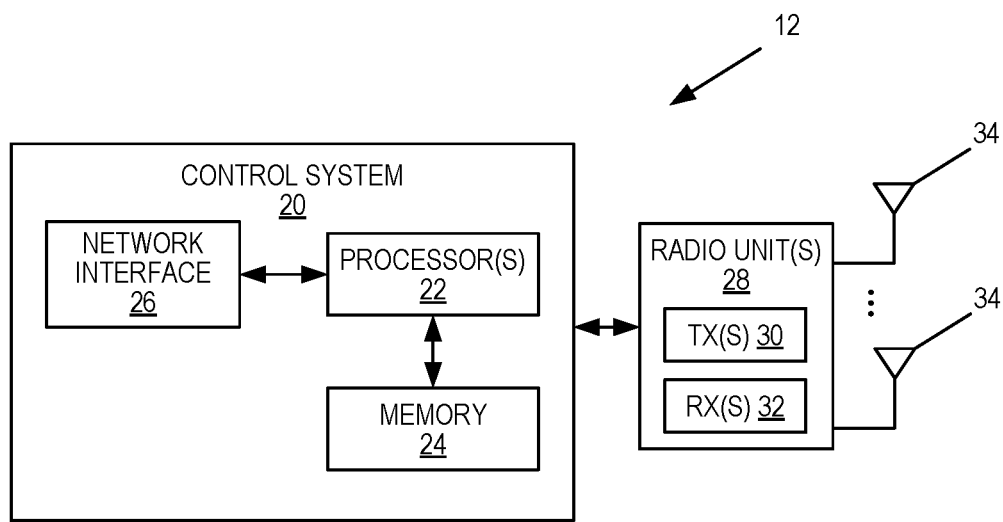
FIGS. 15 through 17 illustrate example embodiments of a radio access node.

FIG. 15 is a schematic block diagram of the radio access node 12 according to some embodiments of the present disclosure. As illustrated, the radio access node 12 includes a control system 20 that includes one or more processors 22 (e.g., Central Processing Units (CPUs), Application Specific Integrated Circuits (ASICs), Field Programmable Gate Arrays (FPGAs), and/or the like), memory 24, and a network interface 26. In addition, the radio access node 12 includes one or more radio units 28 that each includes one or more transmitters 30 and one or more receivers 32 coupled to one or more antennas 34. In some embodiments, the radio unit(s) 28 is external to the control system 20 and connected to the control system 20 via, e.g., a wired connection (e.g., an optical cable). However, in some other embodiments, the radio unit(s) 28 and potentially the antenna(s) 34 are integrated together with the control system 20. The one or more processors 22 operate to provide one or more functions of a radio access node 12 as described herein. In some embodiments, the function(s) are implemented in software that is stored, e.g., in the memory 24 and executed by the one or more processors 22.

Figure 16:
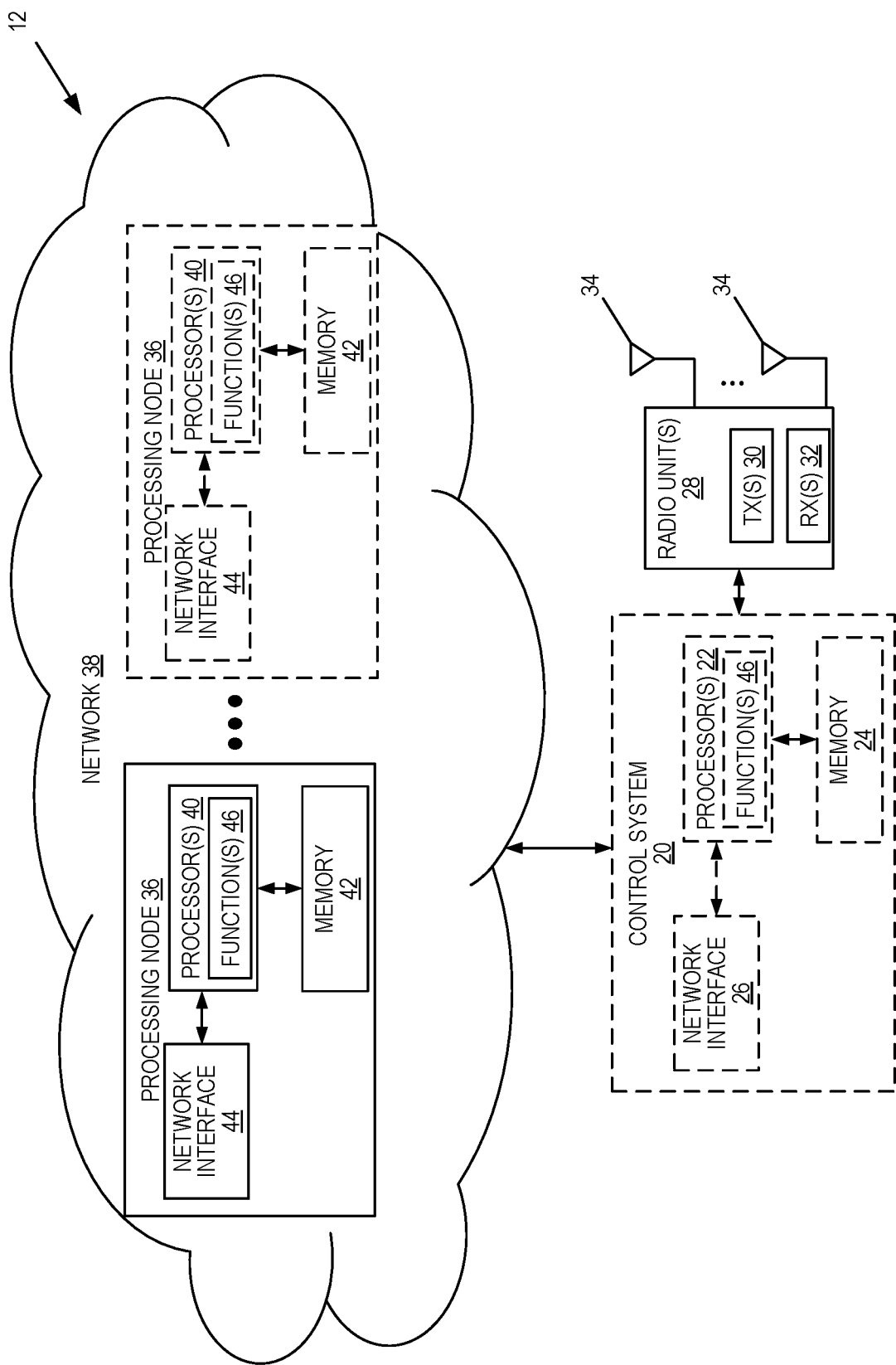

FIG. 16 is a schematic block diagram that illustrates a virtualized embodiment of the radio access node 12 according to some embodiments of the present disclosure. This discussion is equally applicable to other types of network nodes. Further, other types of network nodes may have similar virtualized architectures.

As used herein, a "virtualized" radio access node 12 is an implementation of the radio access node 12 in which at least a portion of the functionality of the radio access node 12 is implemented as a virtual component(s) (e.g., via a virtual machine(s) executing on a physical processing node(s) in a network(s)). As illustrated, in this example, the radio access node 12 includes the control system 20 (optional) that includes the one or more processors 22 (e.g., CPUs, ASICs, FPGAs, and/or the like), the memory 24, the network interface 26, and the one or more radio units 28 that each includes the one or more transmitters 30 and the one or more receivers 32 coupled to the one or more antennas 34, as described above. The control system 20 is connected to the radio unit(s) 28 via, for example, an optical cable or the like. The control system 20 is connected to one or more processing nodes 36 coupled to or included as part of a network(s) 38 via the network interface 26. Each processing node 36 includes one or more processors 40 (e.g., CPUs, ASICs, FPGAs, and/or the like), memory 42, and a network interface 44.

In this example, functions 46 of the radio access node 12 described herein are implemented at the one or more processing nodes 36 or distributed across the control system 20 and the one or more processing nodes 36 in any desired manner. In some particular embodiments, some or all of the functions 46 of the radio access node 12 described herein are implemented as virtual components executed by one or more virtual machines implemented in a virtual environment(s) hosted by the processing node(s) 36. As will be appreciated by one of ordinary skill in the art, additional signaling or communication between the processing node(s) 36 and the control system 20 is used in order to carry out at least some of the desired functions 46. Notably, in some embodiments, the control system 20 may not be included, in which case the radio unit(s) 28 communicate directly with the processing node(s) 36 via an appropriate network interface(s).

In some embodiments, a computer program including instructions which, when executed by at least one processor, causes the at least one processor to carry out the functionality of a radio access node 12 or a node (e.g., a processing node 36) implementing one or more of the functions 46 of the radio access node 12 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
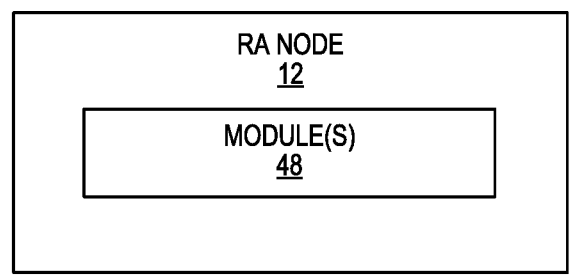

FIG. 17 is a schematic block diagram of the radio access node 12 according to some other embodiments of the present disclosure. The radio access node 12 includes one or more modules 48, each of which is implemented in software. The module(s) 48 provide the functionality of the radio access node 12 described herein. For example, the module(s) 48 include an obtaining module operable to perform the functions of step 100 of FIG. 11, a determining module operable to perform the functions of step 102 of FIG. 11, and a transmitting or sending module operable to perform the functions of step 104 of FIG. 11.

Figure 18:
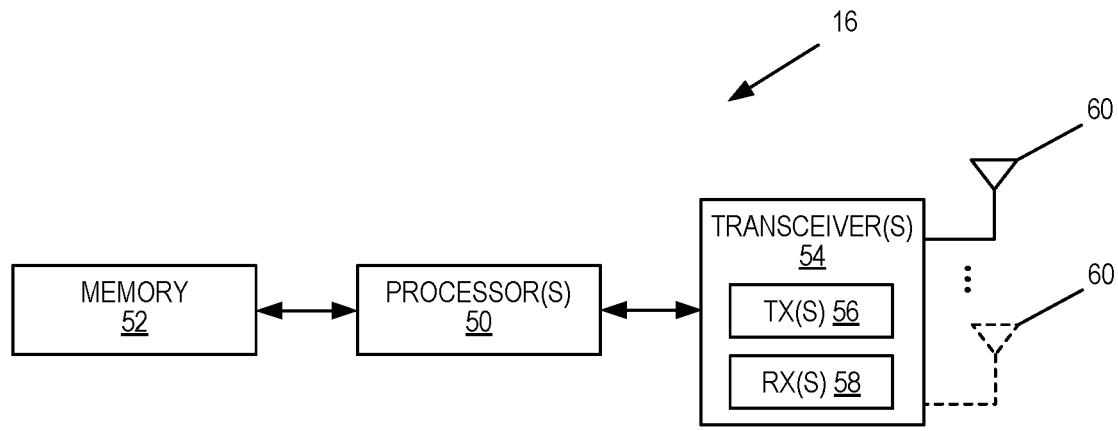
FIGS. 18 and 19 illustrate example embodiments of a wireless device.

FIG. 18 is a schematic block diagram of a wireless device 16 according to some embodiments of the present disclosure. As illustrated, the wireless device 16 includes one or more processors 50 (e.g., CPUs, ASICs, FPGAs, and/or the like), memory 52, and one or more transceivers 54 each including one or more transmitters 56 and one or more receivers 58 coupled to one or more antennas 60. In some embodiments, the functionality of the wireless device 16 described above may be fully or partially implemented in software that is, e.g., stored in the memory 52 and executed by the processor(s) 50.

In some embodiments, a computer program including instructions which, when executed by at least one processor, causes the at least one processor to carry out the functionality of the wireless device 16 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
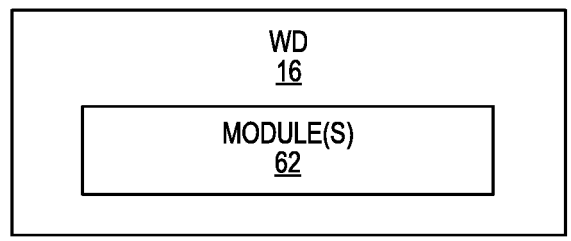

FIG. 19 is a schematic block diagram of the wireless device 16 according to some other embodiments of the present disclosure. The wireless device 16 includes one or more modules 62, each of which is implemented in software. The module(s) 62 provide the functionality of the wireless device 16 described herein. For example, the module(s) 62 may include receiving module operable to receive the indication of step 104 of FIG. 11 and a transmitting module operable to perform the function of step 108 of FIG. 11.

The following acronyms are used throughout this disclosure.
 3GPP Third Generation Partnership Project
 5G Fifth Generation
 ACK Acknowledgement
 AS Antenna Selection
 ASIC Application Specific Integrated Circuit CP-OFDM Cyclic Prefix Orthogonal Frequency Division Multiplexing
CPU Central Processing Unit
CQI Channel Quality Indicator
CRS Cell Specific Reference Signal
CS Cyclic Shifts
CSI Channel State Information
CSI-RS Channel State Information Reference signal
DCI Downlink Control Information
DFT Discrete Fourier Transform
DFT-S-OFDM Discrete Fourier Transform Spread Orthogonal Frequency Division Multiplexing
DMRS Demodulation Reference Signal
eNB Evolved or Enhanced Node B
FDD Frequency Division Duplexing
FH Frequency Hopping
FPGA Field Programmable Gate Array
gNB New Radio Base Station
HARQ Hybrid Automatic Repeat Request
ID Identifier
IFDMA Interleaved Frequency Division Multiple Access
kHz Kilohertz
km/hr Kilometers per Hour
LTE Long Term Evolution
MHz Megahertz
MME Mobility Management Entity
MTC Machine Type Communication
NACK Negative Acknowledgement
NR New Radio
OFDM Orthogonal Frequency Division Multiplexing
PDCCH Physical Downlink Control Channel
PDSCH Physical Downlink Shared Channel
P-GW Packet Data Network Gateway
PMI Precoding Matrix Indicator
PRB Physical Resource Block
PUCCH Physical Uplink Control Channel
PUSCH Physical Uplink Shared Channel
RE Resource Element
Rel Release
RI Rank Indicator
RRC Radio Resource Control
RS Reference Signal
SCEF Service Capability Exposure Function
SC-FDMA Single Carrier Frequency Division Multiple Access
SINR Signal to Interference plus Noise Ratio
SRS Sounding Reference Signal
TDD Time Division Duplexing
UCI Uplink Control Information
UE User Equipment
UpPTS Uplink Pilot Time Slot Those skilled in the art will recognize improvements and modifications to the embodiments of the present disclosure. All such improvements and modifications are considered within the scope of the concepts disclosed herein and the claims that follow.

What is claimed is:

1. A method of operation of a network node to selectively enable antenna selection at a wireless device for uplink sounding reference signal transmission in a Time Division Duplexing, TDD, wireless communication system, comprising:
making a determination as to whether to enable or disable antenna selection at the wireless device for transmission of uplink sounding reference signals based on: an estimated speed of movement of the wireless device; both the estimated speed of movement of the wireless device and a Signal to Interference plus Noise Ratio, SINR, for one or more downlink channels to the wireless device; or the estimated speed of movement of the wireless device, the SINR for the one or more downlink channels to the wireless device, and a rank used for downlink transmission to the wireless device; and
sending, to the wireless device, an indication that indicates whether the wireless device is to enable or disable antenna selection for transmission of uplink sounding reference signals in accordance with the determination;
where making the determination comprises:
obtaining the estimated speed of movement of the wireless device;
determining whether the estimated speed of movement of the wireless device is less than a first speed threshold; and
making the determination to enable antenna selection if the estimated speed of movement of the wireless device is less than the first speed threshold
if the estimated speed of movement of the wireless device is not less than the first speed threshold:
determining whether the SINR for the one or more downlink channels to the wireless device is greater than a first SINR threshold; and
making the determination to disable antenna selection if the estimated speed of movement of the wireless device is not less than the first speed threshold and the SINR for the one or more downlink channels to the wireless device is greater than the first SINR threshold;
where making the determination further comprises, if the SINR for the one or more downlink channels to the wireless device is not greater than the first SINR threshold:
making the determination to enable antenna selection if rank 1 will be used for a later downlink transmission for the wireless device; and
making the determination to disable antenna selection if a rank higher than 1 will be used for later downlink transmission for the wireless device.

2. The method of claim 1 wherein making the determination comprises making the determination as to whether to enable or disable antenna selection at the wireless device for transmission of uplink sounding reference signals based on the estimated speed of movement of the wireless device.

3. The method of claim 1 wherein making the determination comprises making the determination as to whether to enable or disable antenna selection at the wireless device for transmission of uplink sounding reference signals based on the estimated speed of movement of the wireless device and the SINR for the one or more downlink channels to the wireless device.

4. The method of claim 1 wherein making the determination comprises making the determination as to whether to enable or disable antenna selection at the wireless device for transmission of uplink sounding reference signals based on the estimated speed of movement of the wireless device, the SINR for the one or more downlink channels to the wireless device, and the rank used for downlink transmission to the wireless device.

5. The method of claim 1 wherein making the determination further comprises making the determination to disable antenna selection if the estimated speed of movement of the wireless device is not less than the first speed threshold.

6. The method of claim 1 wherein making the determination further comprises, if the estimated speed of movement of the wireless device is not less than the first speed threshold:
   determining whether the estimated speed of movement of the wireless device is greater than a second speed threshold, the second speed threshold being greater than the first speed threshold; and
   making the determination to disable antenna selection if the estimated speed of movement of the wireless device is greater than the second speed threshold.

7. The method of claim 1 wherein making the determination further comprises, if the estimated speed of movement of the wireless device is not less than the first speed threshold:
   determining whether the estimated speed of movement of the wireless device is greater than a second speed threshold;
   determining whether the SINR for the one or more downlink channels to the wireless device is greater than a first SINR threshold; and
   making the determination to disable antenna selection if the estimated speed of movement of the wireless device is greater than the second speed threshold and the SINR for the one or more downlink channels to the wireless device is greater than the first SINR threshold.

8. The method of claim 1 wherein making the determination further comprises, if the SINR for the one or more downlink channels to the wireless device is not greater than the first SINR threshold:
   making the determination to enable antenna selection.

9. The method of claim 1 wherein making the determination further comprises:
   determining whether the SINR for the one or more downlink channels to the wireless device is less than a second SINR threshold; and
   making the determination to enable antenna selection if the SINR for the one or more downlink channels to the wireless device is less than the second SINR threshold.

10. The method of claim 1 wherein the network node is a radio access node.

11. A method of operation of a network node to selectively enable antenna selection at a wireless device for uplink sounding reference signal transmission in a Time Division Duplexing, TDD, wireless communication system, comprising:
   making a determination as to whether to enable or disable antenna selection at the wireless device for transmission of uplink sounding reference signals based on: an estimated speed of movement of the wireless device; both the estimated speed of movement of the wireless device and a Signal to Interference plus Noise Ratio, SINR, for one or more downlink channels to the wireless device; or the estimated speed of movement of the wireless device, the SINR for the one or more downlink channels to the wireless device, and a rank used for downlink transmission to the wireless device; and
   sending, to the wireless device, an indication that indicates whether the wireless device is to enable or disable antenna selection for transmission of uplink sounding reference signals in accordance with the determination;
   wherein making the determination comprises:
      obtaining the estimated speed of movement of the wireless device;
      determining whether the estimated speed of movement of the wireless device is less than a first speed threshold; and
      making the determination to enable antenna selection if the estimated speed of movement of the wireless device is less than the first speed threshold
      if the estimated speed of movement of the wireless device is not less than the first speed threshold:
         determining whether the SINR for the one or more downlink channels to the wireless device is greater than a first SINR threshold; and
         making the determination to disable antenna selection if the estimated speed of movement of the wireless device is not less than the first speed threshold and the SINR for the one or more downlink channels to the wireless device is greater than the first SINR threshold;
   wherein making the determination further comprises:
      determining whether the SINR for the one or more downlink channels to the wireless device is less than a second SINR threshold that is less than the first SINR threshold: and
      if the SINR for the one or more downlink channels to the wireless device is less than the second SINR threshold:
         making the determination to enable antenna selection if rank 1 will be used for a later downlink transmission for the wireless device; and
         making the determination to disable antenna selection if a rank higher than 1 will be used for later downlink transmission for the wireless device.

12. A network node for selectively enabling antenna selection at a wireless device for uplink sounding reference signal transmission, in a Time Division Duplexing, TDD, wireless communication system, comprising:
   at least one processor; and
   memory comprising instructions executable by the at least one processor whereby the network node is operable to:
      make a determination as to whether to enable or disable antenna selection at the wireless device for transmission of uplink sounding reference signals based on:
         an estimated speed of movement of the wireless device; both the estimated speed of movement of the wireless device and a Signal to Interference plus Noise Ratio, SINR, for one or more downlink channels to the wireless device; or the estimated speed of movement of the wireless device, the SINR for the one or more downlink channels to the wireless device, and a rank used for downlink transmission to the wireless device; and
      send, to the wireless device, an indication that indicates whether the wireless device is to enable or disable antenna selection for transmission of uplink sounding reference signals in accordance with the determination;
   where making the determination comprises:
      obtaining the estimated speed of movement of the wireless device;
      determining whether the estimated speed of movement of the wireless device is less than a first speed threshold; and
      making the determination to enable antenna selection if the estimated speed of movement of the wireless device is less than the first speed threshold;
      if the estimated speed of movement of the wireless device is not less than the first speed threshold:

determining whether the SINR for the one or more downlink channels to the wireless device is greater than a first SINR threshold; and making the determination to disable antenna selection if the estimated speed of movement of the wireless device is not less than the first speed threshold and the SINR for the one or more downlink channels to the wireless device is greater than the first SINR threshold;

where making the determination further comprises, if the SINR for the one or more downlink channels to the wireless device is not greater than the first SINR threshold:

making the determination to enable antenna selection if rank 1 will be used for a later downlink transmission for the wireless device; and making the determination to disable antenna selection if a rank higher than 1 will be used for later downlink transmission for the wireless device.

13. The network node of claim 12 wherein the network node makes the determination as to whether to enable or disable antenna selection at the wireless device for transmission of uplink sounding reference signals based on the estimated speed of movement of the wireless device.

14. The network node of claim 12 wherein the network node makes the determination as to whether to enable or disable antenna selection at the wireless device for transmission of uplink sounding reference signals based on the estimated speed of movement of the wireless device and the SINR for the one or more downlink channels to the wireless device.

15. The network node of claim 12 wherein the network node makes the determination as to whether to enable or disable antenna selection at the wireless device for transmission of uplink sounding reference signals based on the estimated speed of movement of the wireless device, the SINR for the one or more downlink channels to the wireless device, and the rank used for downlink transmission to the wireless device.

16. A network node for selectively enabling antenna selection at a wireless device for uplink sounding reference signal transmission, in a Time Division Duplexing, TDD, wireless communication system, the network node comprising: at least one processor and a memory, the memory including instructions which, when executed by the at least one processor, causes the at least one processor to:

make a determination as to whether to enable or disable antenna selection at the wireless device for transmission of uplink sounding reference signals based on: an estimated speed of movement of the wireless device; both the estimated speed of movement of the wireless device and a Signal to Interference plus Noise Ratio, SINR, for one or more downlink channels to the wireless device; or the estimated speed of movement of the wireless device, the SINR for the one or more downlink channels to the wireless device, and a rank used for downlink transmission to the wireless device; and send, to the wireless device, an indication that indicates whether the wireless device is to enable or disable antenna selection for transmission of uplink sounding reference signals in accordance with the determination;

where making the determination comprises the memory including instructions which, when executed by the at least one processor, causes the at least one processor to:

obtain the estimated speed of movement of the wireless device;

determine whether the estimated speed of movement of the wireless device is less than a first speed threshold; and make the determination to enable antenna selection if the estimated speed of movement of the wireless device is less than the first speed threshold;

if the estimated speed of movement of the wireless device is not less than the first speed threshold:

determine whether the SINR for the one or more downlink channels to the wireless device is greater than a first SINR threshold; and make the determination to disable antenna selection if the estimated speed of movement of the wireless device is not less than the first speed threshold and the SINR for the one or more downlink channels to the wireless device is greater than the first SINR threshold;

where making the determination further comprises the memory including instructions which, when executed by the at least one processor, causes the at least one processor to, if the SINR for the one or more downlink channels to the wireless device is not greater than the first SINR threshold:

make the determination to enable antenna selection if rank 1 will be used for a later downlink transmission for the wireless device; and make the determination to disable antenna selection if a rank higher than 1 will be used for later downlink transmission for the wireless device.

17. A network node for selectively enabling antenna selection at a wireless device for uplink sounding reference signal transmission, in a Time Division Duplexing, TDD, wireless communication system, comprising:

a determining module operable to make a determination as to whether to enable or disable antenna selection at the wireless device for transmission of uplink sounding reference signals based on: an estimated speed of movement of the wireless device; both the estimated speed of movement of the wireless device and a Signal to Interference plus Noise Ratio, SINR, for one or more downlink channels to the wireless device; or the estimated speed of movement of the wireless device, the SINR for the one or more downlink channels to the wireless device, and a rank used for downlink transmission to the wireless device; and a sending module operable to send, to the wireless device, an indication that indicates whether the wireless device is to enable or disable antenna selection for transmission of uplink sounding reference signals in accordance with the determination;

where the determining module is further operable to:

obtain the estimated speed of movement of the wireless device;

determine whether the estimated speed of movement of the wireless device is less than a first speed threshold; and make the determination to enable antenna selection if the estimated speed of movement of the wireless device is less than the first speed threshold;

if the estimated speed of movement of the wireless device is not less than the first speed threshold:

determine whether the SINR for the one or more downlink channels to the wireless device is greater than a first SINR threshold; and make the determination to disable antenna selection if the estimated speed of movement of the wireless device is not less than the first speed threshold and the SINR for the one or more downlink channels to the wireless device is greater than the first SINR threshold;

where making the determination further comprises, if the SINR for the one or more downlink channels to the wireless device is not greater than the first SINR threshold:

make the determination to enable antenna selection if rank 1 will be used for a later downlink transmission for the wireless device; and make the determination to disable antenna selection if a rank higher than 1 will be used for later downlink transmission for the wireless device.

\* \* \* \* \*